(12) United States Patent
Moon et al.

(10) Patent No.: US 9,574,777 B2
(45) Date of Patent: Feb. 21, 2017

(54) COOKING APPARATUS

(75) Inventors: Hyun Wook Moon, Seoul (KR); Jae Kyung Yang, Seoul (KR); Sung Hun Sim, Seoul (KR); Heung Sik Choi, Seoul (KR); Wan Soo Kim, Seoul (KR); Ri Na Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 818 days.

(21) Appl. No.: 13/820,213

(22) PCT Filed: May 26, 2011

(86) PCT No.: PCT/KR2011/003881
§ 371 (c)(1),
(2), (4) Date: Jun. 19, 2013

(87) PCT Pub. No.: WO2012/030054
PCT Pub. Date: Mar. 8, 2012

(65) Prior Publication Data
US 2013/0284728 A1    Oct. 31, 2013

(30) Foreign Application Priority Data

Sep. 3, 2010  (KR) .................. 10-2010-0086635
Sep. 3, 2010  (KR) .................. 10-2010-0086636

(51) Int. Cl.
*H05B 6/72*        (2006.01)
*H05B 6/74*        (2006.01)
(Continued)

(52) U.S. Cl.
CPC .............. *F24C 7/02* (2013.01); *H05B 6/686* (2013.01); *H05B 6/72* (2013.01); *Y02B 40/143* (2013.01)

(58) Field of Classification Search
CPC ......... H05B 6/686; H05B 6/72; H05B 6/6402; H05B 6/74; F24C 7/02; Y02B 40/143
(Continued)

(56) References Cited

U.S. PATENT DOCUMENTS 2,920,174 A  *  1/1960  Haagensen  .......... H05B 6/6402
                                                      174/381
4,458,126 A  *  7/1984  Dills  ..................... H05B 6/72
                                                      219/748
(Continued)

FOREIGN PATENT DOCUMENTS

JP    H10-162950      6/1998
JP    2000-164339 A   6/2000
(Continued)

OTHER PUBLICATIONS

Chinese Office Action dated Nov. 4, 2014, issued in Application No. 201180042557.6.
(Continued)

*Primary Examiner* — Quang Van
(74) *Attorney, Agent, or Firm* — KED & Associates, LLP

(57) ABSTRACT

Provided herein is a cooking apparatus. The cooking apparatus includes a plate forming a cavity, a microwave transmission line to transmit microwaves to the inside of the cavity, and a first metal part connected to one end of the microwave transmission line and extended in one direction so as to be parallel with the plate. Thereby, an antenna having improved efficiency is provided.

19 Claims, 22 Drawing Sheets

(51) Int. Cl.
  H05B 6/64 (2006.01)
  F24C 7/02 (2006.01)
  H05B 6/68 (2006.01)
(58) Field of Classification Search
  USPC ....... 219/748, 745, 746, 747, 749, 751, 690; 174/381
  See application file for complete search history.

(56) References Cited

U.S. PATENT DOCUMENTS

| | | | |
|---|---|---|---|
| 5,151,569 A * | 9/1992 | Suh | H05B 6/74 219/751 |
| 2005/0230385 A1* | 10/2005 | Lee | H05B 6/6402 219/751 |
| 2008/0128404 A1 | 6/2008 | Froelicher | 219/395 |
| 2009/0057302 A1 | 3/2009 | Ben-Shmuel et al. | |
| 2009/0321427 A1 | 12/2009 | Hyde et al. | |

FOREIGN PATENT DOCUMENTS

| | | |
|---|---|---|
| JP | 2008-269793 | 11/2008 |
| KR | 10-2004-0067711 A | 7/2004 |
| KR | 10-2006-0104143 | 10/2006 |
| KR | 10-2008-0039101 A | 5/2008 |

OTHER PUBLICATIONS

International Search Report dated Feb. 16, 2012 issued in Application No. PCT/KR2011/003881.

Chinese Office Action dated May 13, 2015 issued in Application No. 201180042557.6 (Original Office Action with English Translation).

Korean Office Action dated Oct. 31, 2016 issued in Application No. 10-2010-0086635.

* cited by examiner

Fig. 9
(a) 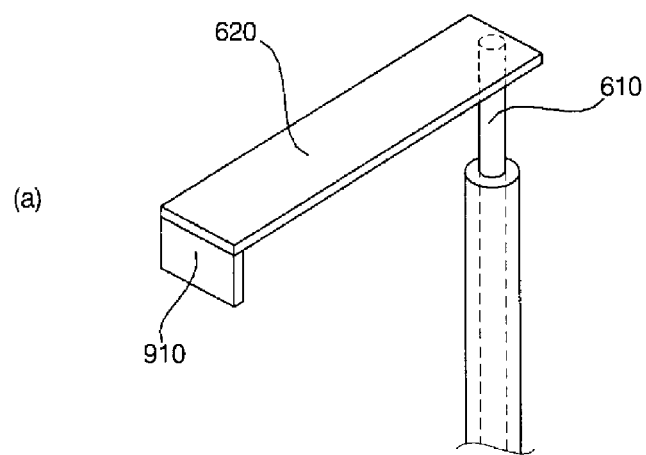
(b) 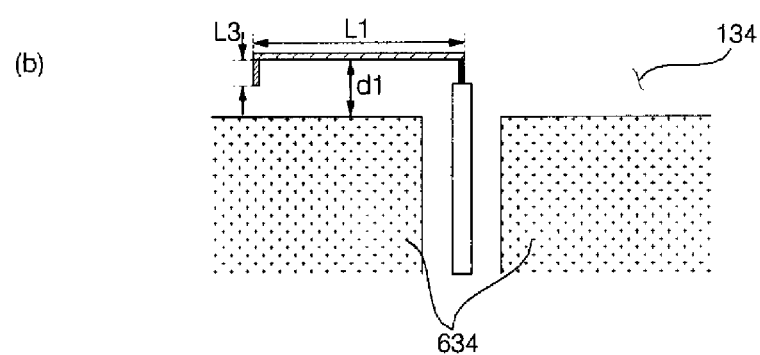

Fig. 11
(a) 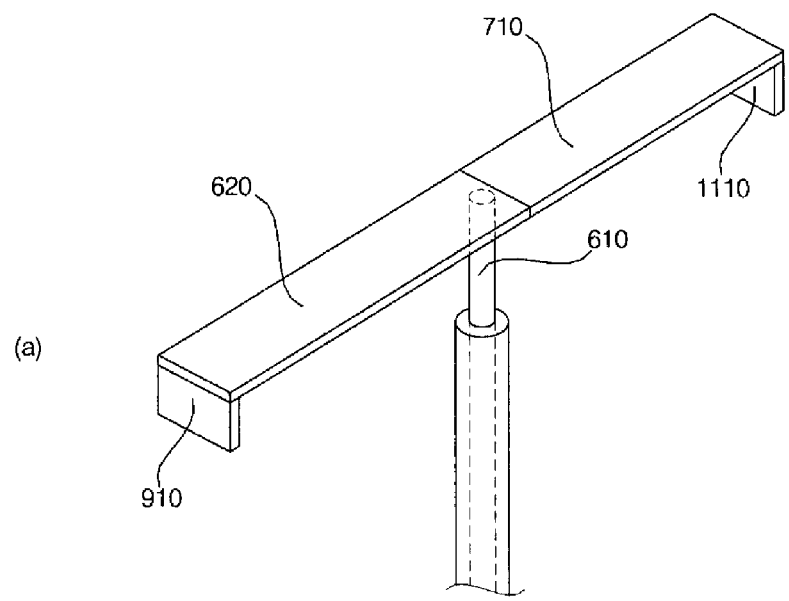
(b) 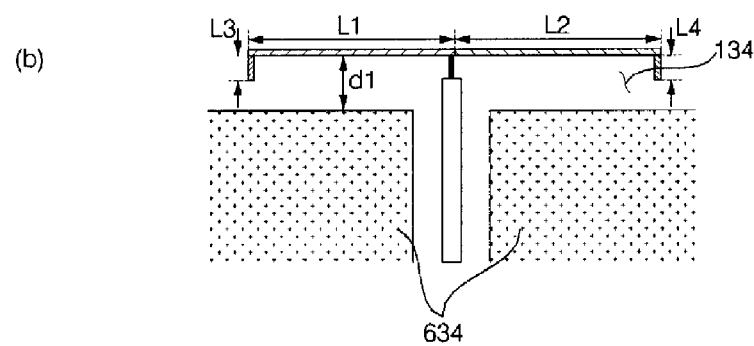

Fig. 13
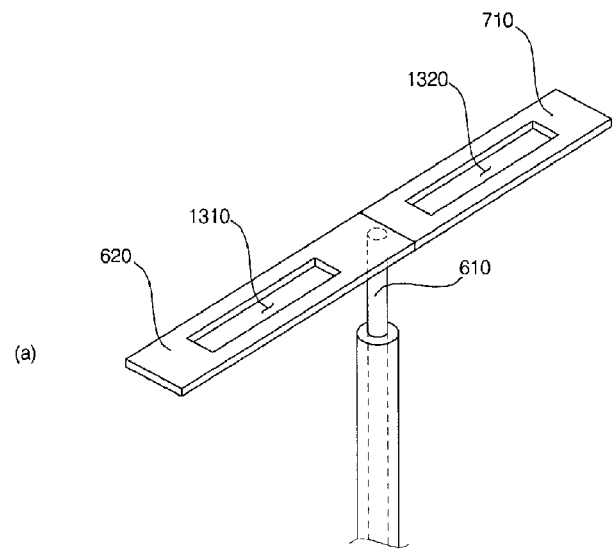
(a)
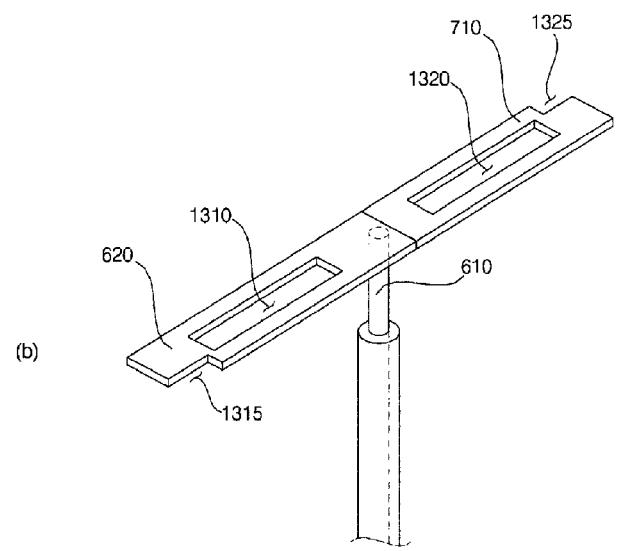
(b)

Fig. 16
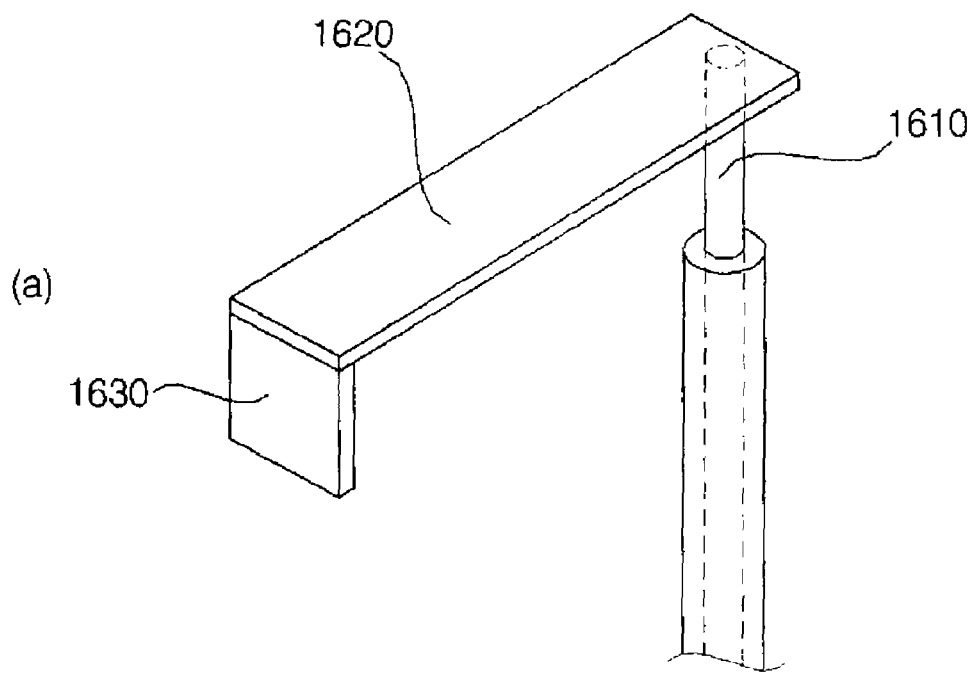
(a)
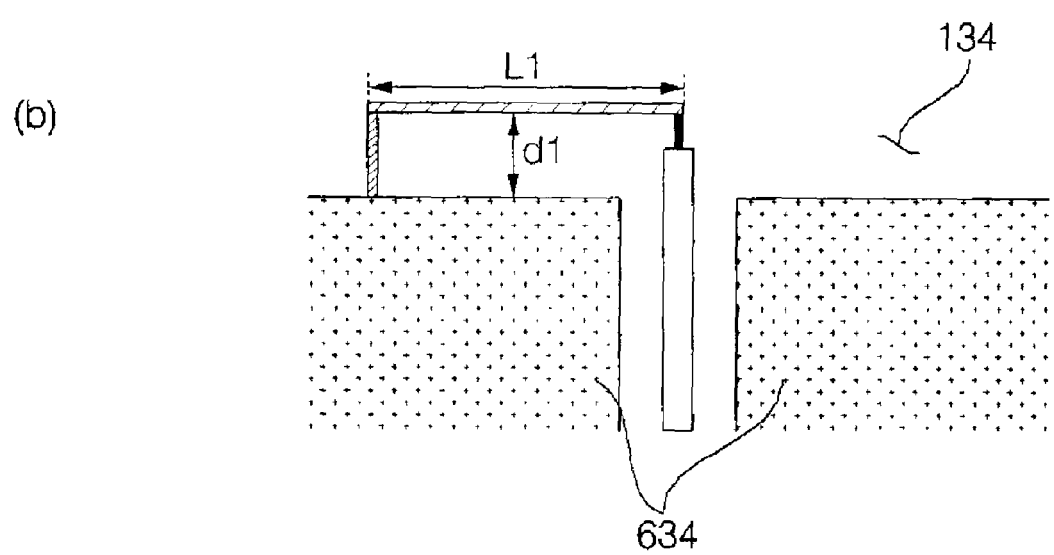
(b)

Fig. 19
(a) 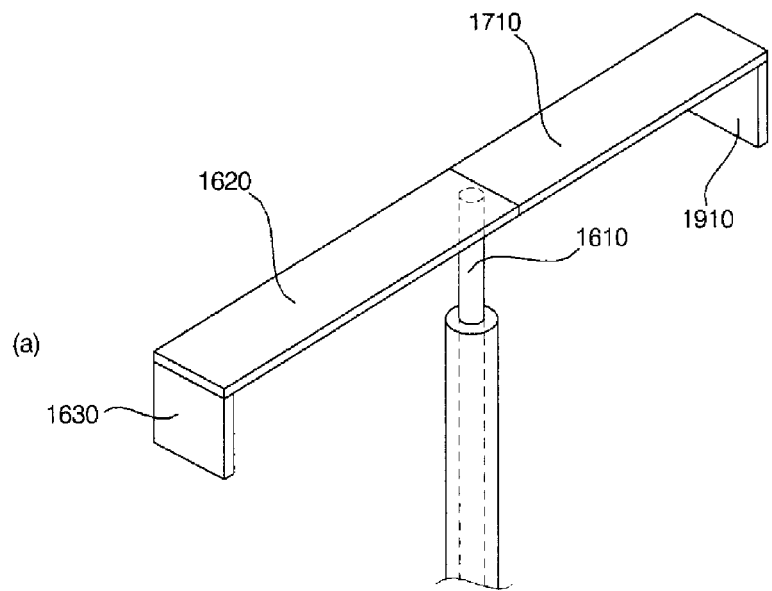
(b) 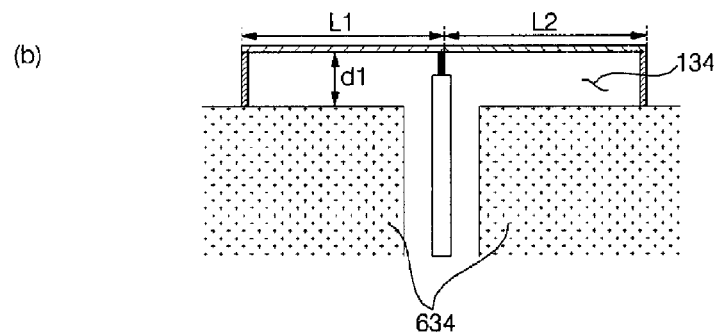

Fig. 22
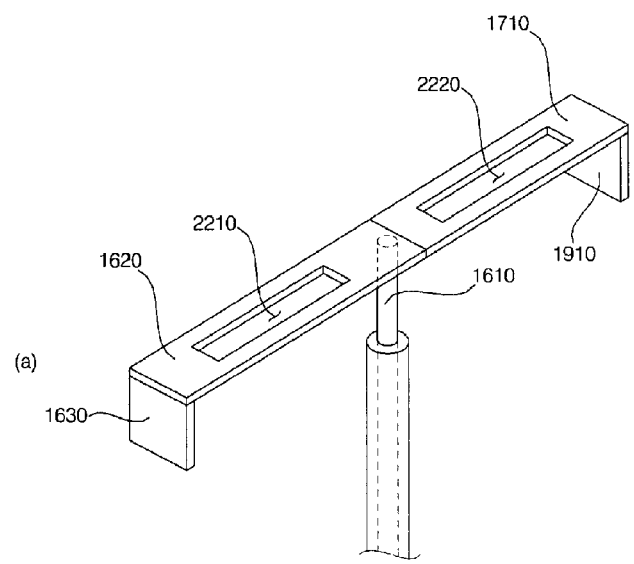
(a)
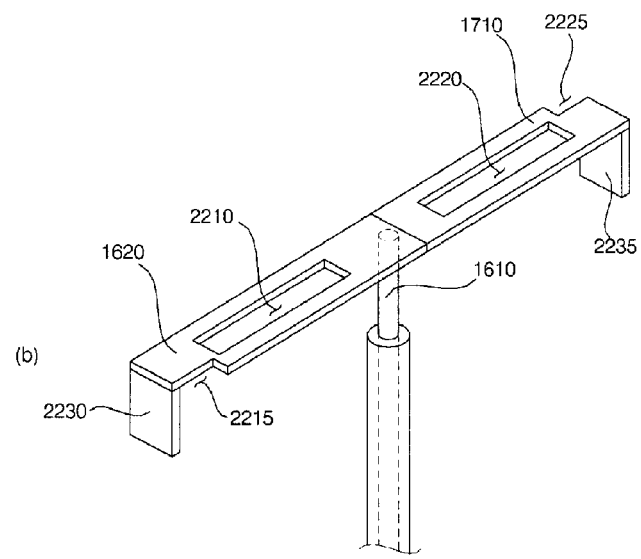
(b)

COOKING APPARATUS

CROSS-REFERENCE TO RELATED PATENT APPLICATIONS

This application is a U.S. National Stage Application under 35 U.S.C. §371 of PCT Application No. PCT/KR2011/003881, filed May 26, 2011, which claims priority to Korean Patent Application Nos. 10-2010-0086635 and 10-2010-0086636, both filed Sep. 3, 2010.

TECHNICAL FIELD

The present invention relates to a cooking apparatus, and more particularly to a cooking apparatus with an antenna having improved efficiency.

BACKGROUND ART

In general, in a cooking apparatus using microwaves, when an operation button is pressed after food is put into a cavity and then the cavity is sealed, voltage is applied to a high-voltage transformer, the commercial voltage applied to the high-voltage transformer is boosted to high-voltage power, the power is applied to a magnetron to generate microwaves and the microwaves generated by the magnetron are transmitted to the cavity through a waveguide, etc.

Here, the cooking apparatus using microwaves heats the food using frictional force generated by vibration of molecules of the food 2,450,000,000 times per second due to irradiation of the microwaves generated by the magnetron onto the food.

Such a cooking apparatus using microwaves has advantages, such as ease of temperature control, cooking time saving, convenience in operation, etc., and thus has been broadly distributed in many households.

However, if food is cooked using microwaves, the food is not uniformly heated due to surface variation of the food and a partial temperature difference of the food may occur. Further, temperature variation during cooking may occur according to kinds of food accommodated in the cooking apparatus.

DISCLOSURE OF INVENTION

Technical Problem

Therefore, the present invention has been made in view of the above problems, and and it is an object of the present invention to provide a cooking apparatus with an antenna having improved efficiency.

Solution to Problem

To achieve the above objects, there is provided a cooking apparatus according to an exemplary embodiment of the present invention, includes a plate forming a cavity, a microwave transmission line to transmit microwaves to the inside of the cavity, and a first metal part connected to one end of the microwave transmission line and extended in one direction so as to be parallel with the plate.

To achieve the above objects, there is provided a cooking apparatus according to an exemplary embodiment of the present invention, including a plate forming a cavity, a microwave transmission line to transmit microwaves to the inside of the cavity, a first metal part connected to one end of the microwave transmission line and extended in one direction, and a second metal part connected to one end of the first metal part and extended so as to be connected to the plate.

Advantageous Effects of Invention

As apparent from the above description, a cooking apparatus using microwaves in accordance with one embodiment of the present invention uses a metal part extended in parallel with a cavity to output microwaves to the inside of the cavity, thereby improving operation efficiency.

Particularly, the cooking apparatus in accordance with the embodiment of the present invention may easily output wideband microwaves.

Further, the cooking apparatus in accordance with the embodiment of the present invention may include a small size antenna, and thus easily achieve impedance matching.

Moreover, the cooking apparatus in accordance with the embodiment of the present invention outputs wideband microwaves and then selectively output microwaves based on calculated efficiencies, thereby uniformly heating an object to be cooked within the cavity.

BRIEF DESCRIPTION OF DRAWINGS

The above and other objects, features and other advantages of the present invention will be more clearly understood from the following detailed description taken in conjunction with the accompanying drawings, in which:

FIGS. 6 to 15 are views illustrating various antennas of the cooking apparatus using microwaves in accordance with the embodiment of the present invention; and FIGS. 16 to 24 are views illustrating various antennas of the cooking apparatus using microwaves in accordance with the embodiment of the present invention.

BEST MODE FOR CARRYING OUT THE INVENTION

The advantages and features of the present invention, and the way of attaining them, will become apparent with reference to embodiments described below in conjunction with the accompanying drawings.

Hereinafter, it will be understood that suffixes "module", "unit", and "part" applied to elements used in the following description are used in consideration of ease of illustration and the suffixes themselves do not have discriminative meanings or roles. Therefore, the suffixes "module", "unit", and "part" may be used interchangeably.

Figure 1:
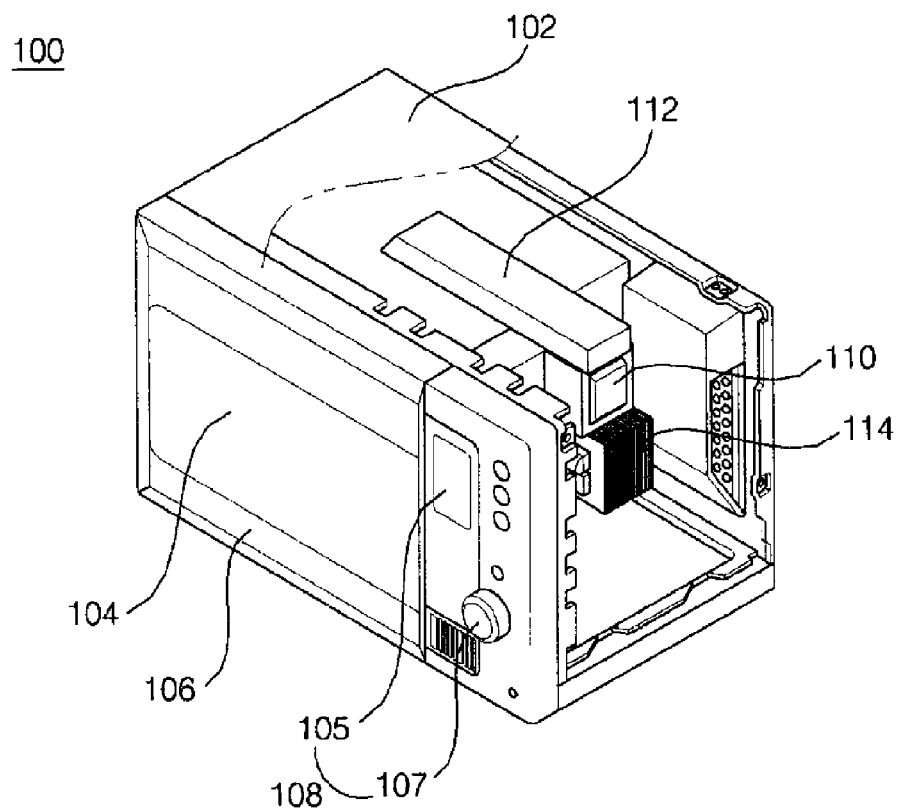
FIG. 1 is a partial perspective view of a cooking apparatus in accordance with one embodiment of the present invention.
Figure 2:
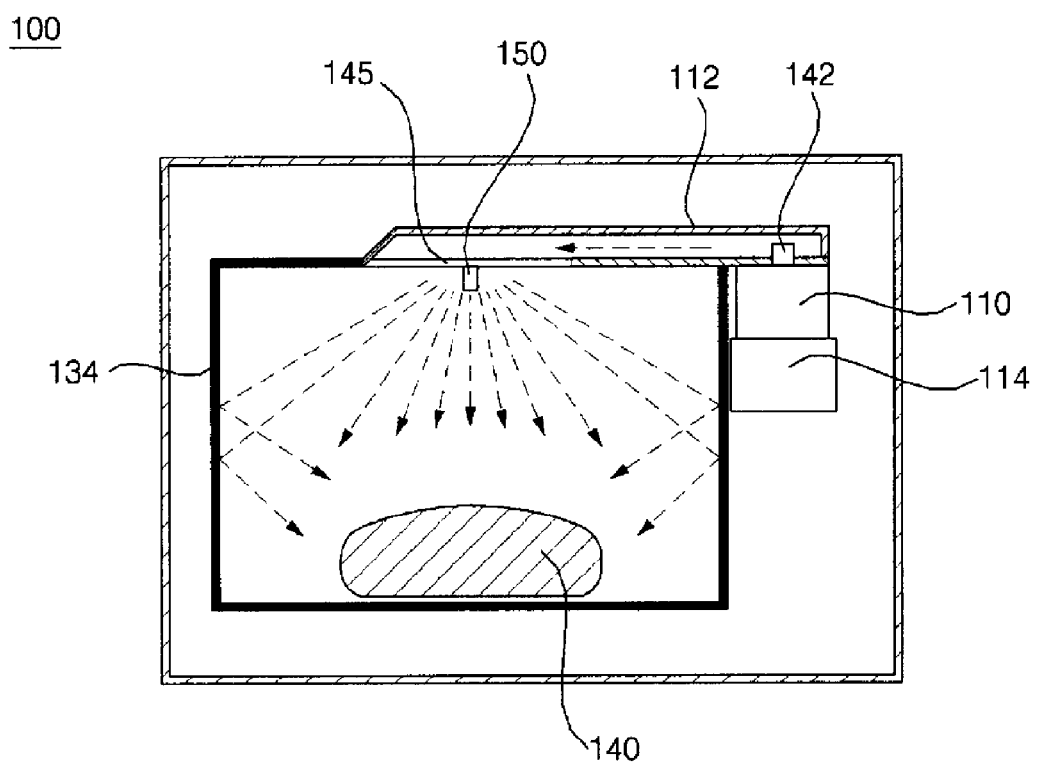
FIG. 2 is a cross-sectional view of the cooking apparatus of FIG. 1.

FIG. 1 is a partial perspective view of a cooking apparatus in accordance with one embodiment of the present invention, and FIG. 2 is a cross-sectional view of the cooking apparatus of FIG. 1.

With reference to FIGS. 1 and 2, a cooking apparatus 100 in accordance with the embodiment of the present invention is configured such that a door 106 provided with a cooking window 104 is connected to a front surface part of a main body 102 so as to be opened and closed and an operation panel 108 is connected to one side of the front surface of the main body 102.

The door 106 opens and closes a cavity 134, and a door choke (not shown) to intercept microwaves may be disposed on the inner surface of the door 106.

The operation panel 108 includes an input unit 107 to control operation of the cooking apparatus 100 and a display 105 to display the operating state of the cooking apparatus 100.

The cavity 134 having an accommodation space of a designated size is provided within the main body 102 such that an object to be heated, for example, food may be accommodated within the cavity 134 and be cooked by microwaves.

The cavity 134 is formed by bonding plates, each of which forms at least one surface, and has an approximately rectangular parallelepiped shape having an opened front surface.

For example, the cavity 134 may be formed by an upper plate forming a ceiling, a rear plate forming the rear surface of the cavity 134, a bottom plate forming the bottom surface of the cavity 134, and a side plate forming the side surfaces of the cavity 134. Further, the door 106 may be disposed on the front surface of the cavity 134. Here, a front plate forming the front surface of the cavity 134 may be formed at regions excluding the door 106.

A microwave generator 110 to generate microwaves is installed on the outer surface of the cavity 134, and a microwave transmission unit 112 to guide the microwaves generated by the microwave generator 112 to the inside of the cavity 134 is disposed at the output side of the microwave generator 110.

The microwave generator 110 may include a magnetron, a Solid State Power Amplifier (SSPA) using a semiconductor, or a Solid State Power Oscillator (SSPO) using a semiconductor.

The SSPA is advantageous in that the SSPA occupies less space than the magnetron. Further, the SSPO is advantageous in that the SSPO does not require a Voltage Controlled Oscillator (VCO) and a Voltage Controlled Attenuator (VCA) as required by the SSPA and thus occupies less space than the SSPA and has a simple circuit configuration.

The SSPA or the SSPO may be implemented as a Hybrid Microwave Integrated Circuit (HMIC) in which passive elements (capacitors, inductors, etc.) and active elements (transistors, etc.) for amplification are separately provided, or a Monolithic Microwave Integrated Circuit (MMIC) in which passive elements and active elements are integrated into one substrate.

The microwave generator 110 may be implemented as one module into which SSPAs or SSPOs are integrated, and may be referred to as a Solid State Power Module (SSPM).

In accordance with the embodiment of the present invention, the microwave generator 110 may generate and output a plurality of microwaves of different frequencies. These frequencies of the microwaves may be in the range of approximately 900 MHz~2,500 MHz. Particularly, the frequencies of the microwaves may be in a designated range around 915 MHz or in a designated range around 2,450 MHz.

The microwave transmission unit 112 transmits the microwaves generated by the microwave generator 110 to the cavity 134. Such a microwave transmission unit 112 may include a transmission line. The transmission line may be a waveguide, a microstrip line or a coaxial cable. In order to deliver the generated microwaves to the microwave transmission unit 112, a feeder 142 is connected, as shown in FIG. 2.

The microwave transmission unit 112 may include an opening 145 communicating with the inside of the cavity 134, as shown in FIG. 2.

The opening 145 may have various shapes, such as a slot. The microwaves are discharged to the cavity 134 through the opening 145.

Although the drawings illustrate one opening 145 as being disposed at the upper portion of the cavity 134, the opening 145 may be disposed at the lower portion or the side portion of the cavity 134, or a plurality of openings may be disposed.

Further, an antenna may be connected to the end of the microwave transmission unit 112.

A power supply unit 114 to supply power to the microwave generator 110 is provided under the microwave generator 110.

The power supply unit 114 includes a high-voltage transformer to boost power input to the cooking apparatus 100 to high voltage and then to supply the high voltage to the microwave generator 110, or an inverter to supply high output voltage of more than approximately 3,500V, generated through switching operation of at least one switch element, to the microwave generator 110.

A cooling fan (not shown) to cool the microwave generator 110 may be installed around the microwave generator 110.

A resonance mode conversion unit (not shown) to convert a resonance mode in the cavity 134 may be disposed. For example, the resonance mode conversion unit (not shown) may include at least one of a stirrer, a rotating table, a sliding table and a Field Adjustment Element (FAE). Among these, the rotating table and the sliding table may be disposed at the lower portion of the cavity 134, and the stirrer may be disposed at various positions, i.e., lower, side and upper positions, of the cavity 134.

In the above-described cooking apparatus 100, after a user opens the door 106 and puts an object 140 to be heated into the cavity 134, when the user closes the door 106, or closes the door 106 and operates the operation panel 108, particularly the input unit 107, and then presses a start button (not shown), the cooking apparatus 100 is operated.

That is, the power supply unit 114 in the cooking apparatus 100 boosts input AC power to high-voltage DC power and then supplies the high-voltage DC power to the microwave generator 110, the microwave generator 110 generates and outputs corresponding microwaves, and the microwave transmission unit 112 transmits the generated microwaves so as to discharge the microwaves to the inside of the cavity 134. Thereby, the object 140 to be heated, for example, food located within the cavity 134, is heated.

Figure 3:
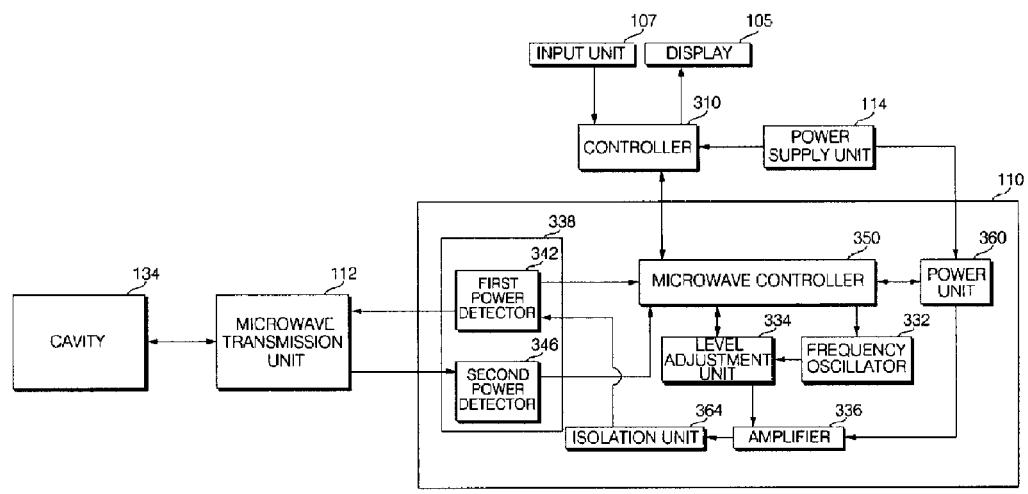
FIG. 3 is a block diagram briefly illustrating one example of the inside of the cooking apparatus of FIG. 1.

FIG. 3 is a block diagram briefly illustrating one example of the inside of the cooking apparatus of FIG. 1.

With reference to FIG. 3, the cooking apparatus 100 in accordance with the embodiment of the present invention includes the microwave generator 110, the microwave transmission unit 112, the cavity 134, a controller 310 and the power supply unit 114.

The microwave generator 110 includes a frequency oscillator 332, a level adjustment unit 334, an amplifier 336, a directional coupler 338, a first power detector 342, a second power detector 346, a microwave controller 350, a power unit 360 and an isolation unit 364. The microwave generator 110 implemented as the SSPA will be exemplarily described.

In the above elements, two or more elements may be combined into one element, or one element may be divided into two or more elements, as needed in actual applications.

The frequency oscillator 332 oscillates and outputs microwaves of a corresponding frequency by a frequency control signal from the microwave controller 350. The frequency oscillator 332 may include a Voltage Controlled Oscillator (VCO). The VCO oscillates the corresponding frequency according to a voltage level of the frequency control signal. For example, as the voltage level of the frequency control signal is higher, the frequency oscillated and generated by the VCO is higher.

The level adjustment unit 334 oscillates and outputs the microwaves, having being oscillated and output by the frequency signal of the frequency oscillator 332, with corresponding power according to a power control signal. The level adjustment unit 334 may include a Voltage Controlled Attenuator (VCA).

The VCA performs a cancellation operation so as to output the microwaves with corresponding power according to the voltage level of the power control signal. For example, as the voltage level of the power control signal is higher, the power level of the signal output from the VCA is higher.

The amplifier 336 amplifies, based on the frequency signal oscillated by the frequency oscillator 332 and the power control signal generated by the level adjustment unit 334, the oscillated frequency signal and then outputs microwaves.

The Directional Coupler (DC) 338 transmits the microwaves amplified and output from the amplifier 336 to the microwave transmission unit 112. The microwaves output from the microwave transmission unit 112 heat the object in the cavity 134.

Microwaves, which are not absorbed by the object in the cavity 134, instead being reflected by the object, may be input to the DC 338 through the microwave transmission unit 112. The DC 338 transmits the reflected microwaves to the microwave controller 350.

The DC 338 may include the first power detector 342 to detect power of output microwaves and the second power detector 346 to detect power of reflected microwaves. The first power detector 342 and the second power detector 346 may be disposed between the DC 338 and the microwave controller 350, and be disposed on the DC 338 on a circuit.

The first power detector 342 detects output power of microwaves amplified by the amplifier 336 and transmitted to the microwave transmission unit 112 via the DC 338. The detected power signal is input to the microwave controller 350 and is used in heating efficiency calculation. The first power detector 342 may include a resistor, a Schottky diode element, etc. for power detection.

On the other hand, the second power detector 346 detects power of microwaves reflected by the inside of the cavity 134 and received by the DC 338. The detected power signal is input to the microwave controller 350 and is used in heating efficiency calculation. The second power detector 346 may include a resistor, a Schottky diode element, etc. for power detection.

The microwave controller 350 is operated by drive power supplied from the power unit 360 of the microwave generator 110. The microwave controller 350 may control operation of the elements of the microwave generator 110 in communication with the controller 310.

The microwave controller 350 calculates heating efficiencies based on microwaves, which are not absorbed by the object, instead being reflected by the object, from among the microwaves discharged to the inside of the cavity 134.

$$h_e = \frac{P_t - P_r}{P_t} \quad \text{[Equation 1]}$$

Here, $P_t$ represents power of microwaves discharged to the inside of the cavity 134, $P_r$ represents power of microwaves reflected by the inside of the cavity 134, and $h_e$ represents heating efficiency of microwaves.

According to Equation 1 above, as the power of the reflected microwaves is higher, the heating efficiency he is smaller.

If microwaves of a plurality of frequencies are discharged to the inside of the cavity 134, the microwave controller 350 calculates heating efficiencies $h_e$ of the microwaves according to frequencies. Such heating efficiency calculation may be performed throughout the entire cooking session according to the embodiment of the present invention.

In order to effectively achieve heating, the entire cooking session may be divided into a scanning session and a heating session. During the scanning session, the microwaves of the plurality of frequencies are sequentially discharged to the inside of the cavity 134, and heating efficiencies are calculated based on reflected microwaves. Further, during the heating session, the microwaves are output for different output times according to frequencies or only microwaves of a designated frequency are output, based on the heating efficiencies calculated during the scanning session. Preferably, power of the microwaves during the heating session is considerably greater than power of the microwaves during the scanning session.

The microwave controller 350 generates and outputs a frequency control signal so as to vary the output times of the microwaves according to the calculated heating efficiencies. The frequency oscillator 332 oscillates a corresponding frequency according to the input frequency control signal.

The microwave controller 350 generates the frequency control signal so that, if the calculated heating efficiency $h_e$ is high, the output time of the corresponding microwaves becomes short. That is, while the microwaves of the plurality of frequencies are sequentially swept, output times of the microwaves of the plurality of frequencies may be varied according to the calculated heating efficiencies. That is, as the heating efficiency $h_e$ is higher, the corresponding output time is preferably shorter. Thereby, the microwaves may be uniformly absorbed by the object to be heated within the cavity 134 according to frequencies, and thus uniformly heat the object.

On the other hand, the microwave controller 350 may control the microwaves such that the microwaves of the corresponding frequencies are output, only if the calculated heating efficiencies $h_e$ according to the frequencies are more than a set reference heating efficiency. That is, microwaves of frequencies having low heating efficiencies $h_e$ are excluded from an actual heating time, and thereby may effectively and uniformly heat the object.

The microwave controller 350, the power unit 360, the frequency oscillator 332, the level adjustment unit 334, the amplifier 336, the DC 338, the first power detector 342 and the second power detector 346 of the above-described microwave generator 110 may be integrated into one module. That is, these elements may be disposed on a single substrate so as to be integrated into one module.

The microwave controller 350 calculates heating efficiencies of the microwaves according to frequencies, based on microwaves, which are not absorbed by food in the cavity 134, instead being reflected by the food, from among the microwaves discharged to the inside of the cavity 134, and calculates microwaves of frequencies, the calculated heating efficiencies of which are more than the set reference heating efficiency. Further, the microwave controller 350 calculates microwave frequencies, and calculates heating times of the calculated microwave frequencies. For example, if heating efficiency is more than the set reference heating efficiency, as the heating efficiency is higher, the heating time of the microwaves of the corresponding frequency is shorter. Thereby, the object may be uniformly heated.

The microwave controller 350 controls the frequency oscillator 332 and the level adjustment unit 334 so as to output microwaves to heat the food in the cavity to the inside of the cavity 134 based on the calculated heating efficiencies. Preferably, power of microwaves output to the cavity 134 during heating is considerably greater than power of microwaves output to the cavity 134 during measurement of the heating efficiencies.

If the heating efficiency, calculated based on the microwaves reflected by the inside of the cavity 134 from among the output microwaves, is below a reference efficiency during the heating session, the microwave controller 350 controls the microwave generator 110 so as to stop output of the microwaves of the corresponding frequency and to output the microwaves of the next frequency. Thereby, heating may be effectively performed.

Further, the microwave controller 350 calculates heating efficiencies of the microwaves of the plurality of frequencies, based on the microwave frequencies reflected by the inside of the cavity 134 from among the microwaves output from the amplifier 336, and sets heating times of the respective microwaves during the heating session according to the calculated heating efficiencies.

For example, if, from among the microwaves of the plurality of frequencies, heating efficiency of microwaves of a first frequency is higher than heating efficiency of microwaves of a second frequency, the microwave controller 350 sets heating time of the microwaves of the first frequency to be shorter than heating time of the microwaves of the second frequency.

The microwave controller 350 outputs the same power control signal for the microwaves of the respective frequencies to the microwave generator 110 during heating. Further, the level adjustment unit 334 outputs a regular power level according to the input power control signal.

The power unit 360 supplies drive power to the elements of the microwave generator 110. The power unit 360 supplies drive power to the microwave controller 350 and the amplifier 336. The power unit 360 receives external power supplied from the power supply unit 114, performs regulation of the external power, and then supplies the regulated power to the inside of the microwave generator 110.

The isolation unit 364 is disposed between the amplifier 336 and the DC 338, passes microwaves amplified by the amplifier 336 if the amplified microwaves are transmitted to the cavity 134, and intercepts microwaves reflected by the inside of the cavity 134. The isolation unit 364 may include an isolator. The microwaves reflected by the inside of the cavity 134 are absorbed by a resistor in the isolation unit 364 and thus do not enter the amplifier 336. Thereby, entry of the reflected microwaves to the amplifier 336 is prevented.

The microwave transmission unit 112 transmits a plurality of microwave frequencies generated and output from the microwave generator 110 to the cavity 134. Such a microwave transmission unit 112 may include a transmission line. The transmission line may be a waveguide, a microstrip line or a coaxial cable.

In order to deliver the generated microwaves to the microwave transmission unit 112, the feeder 142 is connected, as shown in FIG. 2.

The controller 310 controls the overall operation of the cooking apparatus 100 in response to a signal received from the input unit 107. The controller 310 communicates with the microwave controller 350 of the microwave generator 110, thus controlling operation of the elements of the microwave generator 110. The controller 310 controls the display 105 so as to display current operation, remaining cooking time, a kind of food to be cooked, etc. of the cooking apparatus 100 to the outside.

The power supply unit 114 may include a high-voltage transformer to boost power input to the cooking apparatus 100 to a high voltage and then to supply the high voltage to the microwave generator 110, or an inverter to supply high output voltage of more than approximately 3,500 V, generated through switching operation of at least one switch element, to the microwave generator 110. Further, the power supply unit 114 supplies drive voltage to the controller 310.

The block diagram of the cooking apparatus 100 shown in FIG. 3 is a block diagram in accordance with the embodiment of the present invention. The respective elements of the block diagrams may be integrated, added, or omitted according to specifications of the actually implemented cooking apparatus 100. That is, two or more elements may be combined into one element, or one element may be divided into two or more elements, as needed. Further, functions performed by respective blocks are provided to describe the embodiment of the present invention, and detailed operations or devices thereof do not limit the scope of the invention.

Figure 4:
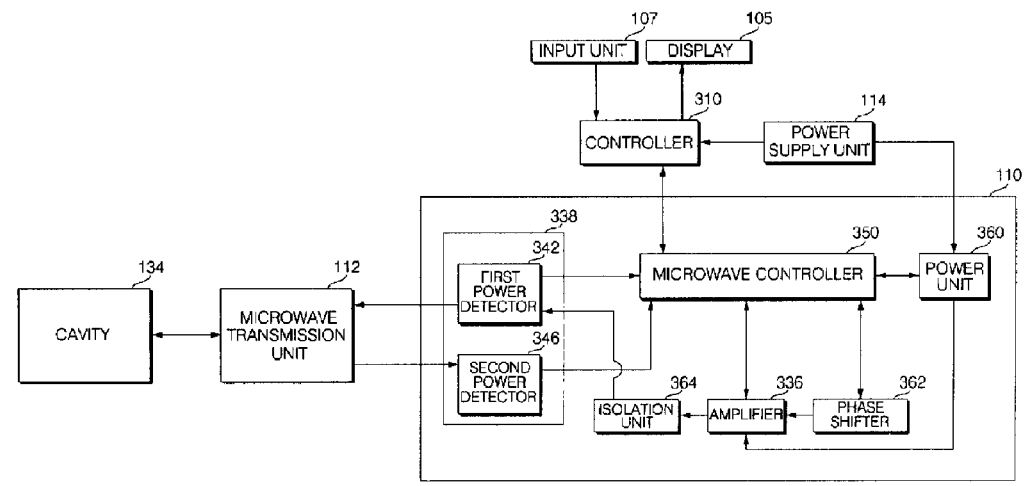
FIG. 4 is a block diagram briefly illustrating another example of the inside of the cooking apparatus of FIG. 1.

FIG. 4 is a block diagram briefly illustrating another example of the inside of the cooking apparatus of FIG. 1.

With reference to FIG. 4, differing from the microwave generator 110 of FIG. 3, the microwave generator 110 implemented as the SSPO will be exemplarily described.

A detailed description of elements of FIG. 4, which are substantially the same as those of FIG. 3, will be omitted.

In accordance with the embodiment of the present invention, the microwave generator 110 includes the microwave controller 350, the power unit 360, a phase shifter 362, the amplifier 336, the isolation unit 364 and the Directional Coupler (DC) 338.

The DC 338 may include the first power detector 342 and the second power detector 346, as described above.

The microwave generator 110 of FIG. 4 differs from the microwave generator 110 of FIG. 3 in that the microwave generator 110 of FIG. 4 excludes the frequency oscillator 322 and the level adjustment unit 334 of the microwave generator 110 of FIG. 3 and additionally includes the phase shifter 362. Therefore, differing from the microwave generator 110 of FIG. 3, the microwave controller 350 controls the amplifier 336 so as to output microwaves to heat food in the cavity 134, based on calculated heating efficiencies he, to the inside of the cavity 134.

The amplifier 336 receives DC power supplied from the power supply unit 360, and performs frequency oscillation and amplification for itself. That is, the amplifier 336 performs frequency oscillation and performs amplification operation for itself based on received DC power without a separate frequency oscillator to generate and output a frequency oscillation signal.

The amplifier 336 may include at least one RF power transistor. If a plurality of RF power transistors is used, the plural RF power transistors may be connected in series, in parallel, or through combination of series connection and parallel connection so as to achieve multi-stage amplification. For example, such an amplifier 336 may be an RF power transistor. Further, output of the amplifier 336 may be approximately 100 to 1,000 W.

The phase shifter 362 feeds back output of the amplifier 336, thus achieving phase shift. A phase shift amount may be adjusted by a phase control signal of the microwave controller 350. The phase shifter 362 achieves phase shift of an amplification signal of a designated frequency output from the amplifier 336, thereby generating microwaves of various frequencies, as described above. For example, the number of frequencies may be increased in proportion to the phase shift amount.

Preferably, a signal corresponding to approximately 1% to 2% of an amplification signal level of a designated frequency is sampled and input to the phase shifter 362. This is done in consideration of re-amplification in the amplifier 336 after feedback.

Next, the isolation unit 364 re-supplies the signal, the phase of which has been shifted by the phase shifter 362, to the amplifier 336. If the level of the signal, the phase of which has been shifted by the phase shifter 362, is below a set value, the isolation unit 364 may supply the signal, the phase of which has been shifted, to a ground terminal instead of to the amplifier 336.

The signal supplied by the isolation unit 364 is re-amplified by the amplifier 336. Thereby, microwaves of a plurality of different frequencies are sequentially output.

As described above, since the amplifier 336 performs frequency oscillation and amplification for itself, the microwave generator 110 may be formed in a simple structure. Further, microwaves of a plurality of frequencies may be generated and output using the phase shifter 362.

Figure 5:
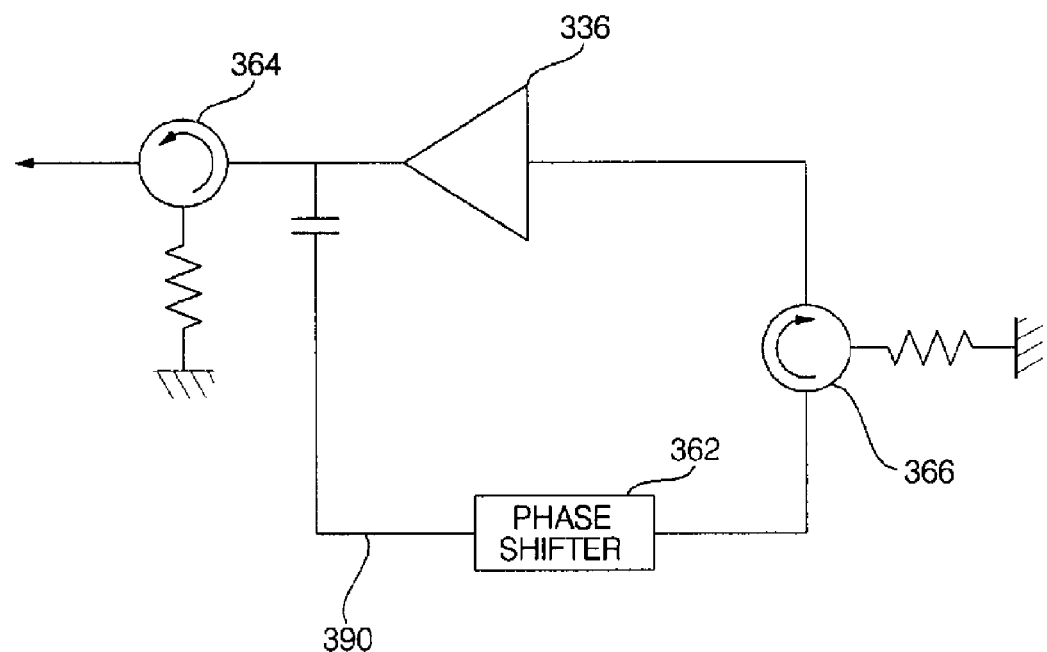
FIG. 5 is a circuit diagram briefly illustrating the inside of a solid state power oscillator of FIG. 4.

FIG. 5 is a circuit diagram briefly illustrating the inside of the SSPO of FIG. 4.

With reference to FIG. 5, the SSPO includes the amplifier 336, the phase shifter 362, the first isolation unit 364 and a second isolation unit 366.

The amplifier 336 receives DC power from the power unit 360, and performs frequency oscillation and amplification for itself. That is, the amplifier 336 performs frequency oscillation and performs amplification operation for itself according to receipt of DC power without a separate frequency oscillator to generate and output a frequency oscillation signal.

The amplifier 336 may include at least one RF power transistor. If a plurality of RF power transistors is used, the plural RF power transistors may be connected in series, in parallel, or through combination of series connection and parallel connection so as to achieve multi-stage amplification. For example, such an amplifier 336 may be an RF power transistor. Further, output of the amplifier 336 may be approximately 100 to 1,000 W.

Next, the phase shifter 362 feeds back output of the amplifier 336, thus achieving phase shift. A phase shift amount may be adjusted by a phase control signal of the controller 310. The phase shifter 362 achieves phase shift of an amplification signal of a designated frequency output from the amplifier 336, thereby generating microwaves of various frequencies, as described above. For example, the number of frequencies may be increased in proportion to the phase shift amount.

Preferably, a signal corresponding to approximately 1% to 2% of an amplification signal level of a designated frequency is sampled and input to the phase shifter 362. This is done in consideration of re-amplification in the amplifier 336 after feedback.

The first isolation unit 364 is located between the amplifier 336 and the DC 338, and transmits the microwaves of the plurality of different frequencies, sequentially output from the amplifier 336, to the microwave transmission unit 112. In more detail, the first isolation unit 364 supplies the microwaves to the microwave transmission unit 112 via the DC 338. If a signal level of the microwaves supplied from the amplifier 336 is below a set value, the first isolation unit 364 may supply the microwaves to a ground terminal instead of to the microwave transmission unit 112.

Next, the second isolation unit 366 re-supplies the signal, the phase of which has been shifted by the phase shifter 362, to the amplifier 336. If the level of the signal, the phase of which has been shifted by the phase shifter 362, is below a set value, the second isolation unit 366 may supply the signal, the phase of which has been shifted, to a ground terminal instead of to the amplifier 336.

The signal supplied by the second isolation unit 36 is re-amplified by the amplifier 336. Thereby, microwaves of a plurality of different frequencies are sequentially output.

A feedback transmission line 390 serves to connect the output terminal of the amplifier 336 to the phase shifter 362. The phase shifter 362 is located on the feedback transmission line 390, and, in accordance with the embodiment of the present invention, may include impedance elements, such as a switch and/or a diode.

FIGS. 6 to 15 are views illustrating various antennas of the cooking apparatus using microwaves in accordance with the embodiment of the present invention.

First, with reference to FIGS. 6(a) and 6(b), the cooking apparatus using microwaves in accordance with the embodiment of the present invention includes an antenna. FIG. 6(a) exemplarily illustrates that the antenna including a first metal part 620 is protruded to the inside of the cavity 134.

The first metal part 620 of the antenna is connected to one end of a microwave transmission line 610 to transmit microwaves to the inside of the cavity 134 and is extended in one direction. Particularly, the first metal part 620 may be extended in parallel with a plate 634 forming the cavity 134. For example, if the antenna is formed on the ceiling of the cavity 134, the first metal part 620 may be formed in parallel with the rear plate forming the ceiling of the cavity 134. Further, if the antenna is formed on the ceiling of the cavity 134, the first metal part 620 may be formed in parallel with the bottom plate forming the bottom surface of the cavity 134. In addition, the first metal part 620 may be formed at various positions, i.e., the rear plate or the side plate, in parallel with the corresponding plate.

FIG. 6(b) is a side view exemplarily illustrating the antenna structure. If the first metal part 620 of the antenna is extended in parallel with the plate 634 forming the cavity 134, a magnetic field rotating around the first metal part 620 is formed, and an electric field is formed between the first metal part 620 and the plate 634 formed of metal.

If the end of the first metal part 620 is not connected to the plate 634, as shown in FIG. 6(b), the first metal part 620 and the plate 634 do not form a loop, like a coil, and thus the magnetic field is not concentrated. Therefore, an electric field component is more strengthened than a magnetic field component. Thereby, such an antenna structure may be referred to as an electric antenna.

A frequency band of microwaves which may be output may be set according to a length L1 of the first metal part 620 and a distance d1 between the first metal part 620 and the plate 634.

The antenna structure of FIGS. 6(a) and 6(b) is disposed in parallel with the plate 634, differing from a conventional monopole antenna structure protruded to the inside of a cavity, thus having a small protrusion degree and a small size.

Further, adjustment factors regarding the frequency band of the microwaves, such as the length L1 of the first metal part 620 and the distance d1 between the first metal part 620 and the plate 634, increase, and thus the above antenna structure may output considerably wideband microwaves, compared to the monopole antenna. Moreover, such an antenna structure may easily achieve impedance matching.

Although not shown in FIGS. 6(a) and 6(b), an antenna cover to cover the antenna structure of FIGS. 6(a) and 6(b) may be formed. The antenna cover may protect the antenna from pieces of an object to be cooked during operation of the cooking apparatus. Particularly, since such an antenna structure has a small protrusion degree compared to the conventional antenna, the antenna cover may easily protect the antenna structure. Such an antenna cover may be applied to antennas which will be described later with reference to FIGS. 7 to 13.

Further, the above antenna may be provided in plural number differing from FIGS. 6(a) and 6(b). In the same manner, antennas which will be described later with reference to FIGS. 7 to 13 may be provided in plural number.

Next, with reference to FIGS. 7(a) and 7(b), an antenna structure of FIGS. 7(a) and 7(b) includes a first metal part 620 similarly to the antenna structure of FIGS. 6(a) and 6(b), and further includes a second metal part 710. FIG. 7(a) exemplarily illustrates that the antenna including the first metal part 620 and the second metal part 710 is protruded to the inside of the cavity 134. Hereinafter, parts of the antenna structure of FIGS. 7(a) and 7(b) differing from the antenna structure of FIGS. 6(a) and 6(b) will be described.

The second metal part 710 of the antenna is connected to one end of the microwave transmission line 610 to transmit microwaves to the inside of the cavity 134 and is extended in one direction. Particularly, the second metal part 710 may be extended in parallel with the plate 634 forming the cavity 134. FIGS. 7(a) and 7(b) exemplarily illustrate the second metal part 710 as being formed in the opposite direction to the first metal part 620, i.e., at an angle of 180 degrees with respect to the first metal part 620.

FIG. 7(b) is a side view exemplarily illustrating the antenna structure. A frequency band of microwaves which may be output may be set according to a length L1 of the first metal part 620, a distance d1 between the first metal part 620 and the plate 634 and a length L2 of the second metal part 710.

If the end of the first metal part 620 and the end of the second metal part 710 are not connected to the plate 634, similarly to the antenna structure of FIGS. 6(a) and 6(b), the first metal part 620, the second metal part 710 and the plate 634 do not form a loop, like a coil, and thus the magnetic field is not concentrated. Therefore, the electric field component is more strengthened than the magnetic field component. Thereby, such an antenna structure may be referred to as an electric antenna.

Figure 7:
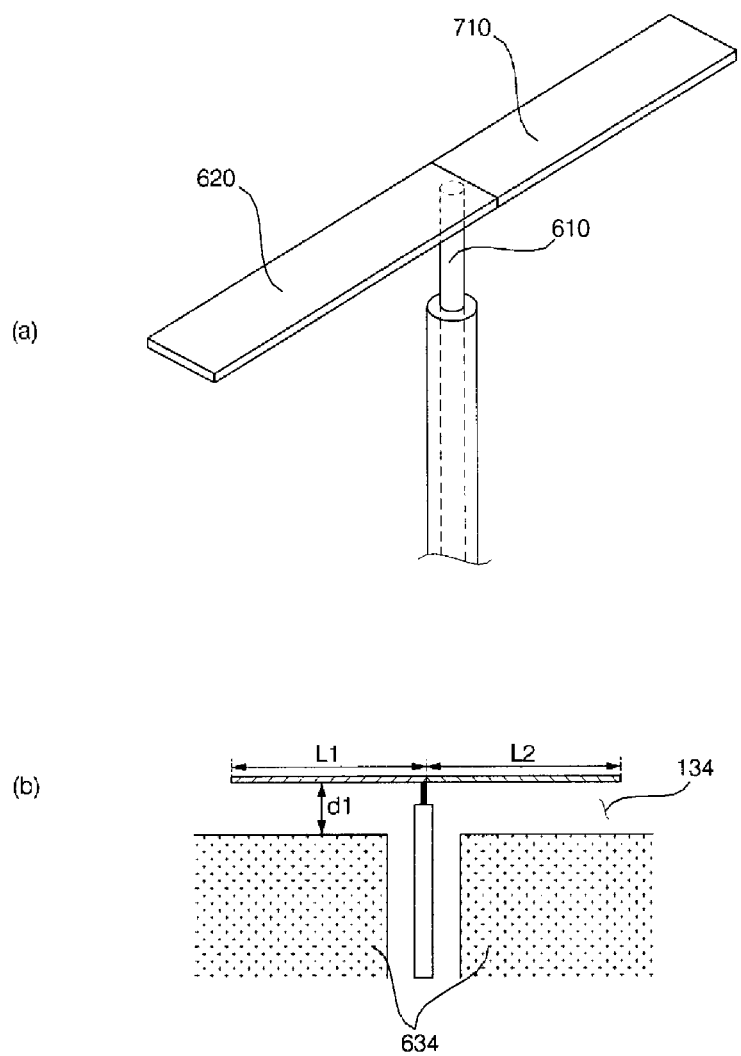
Figure 8:
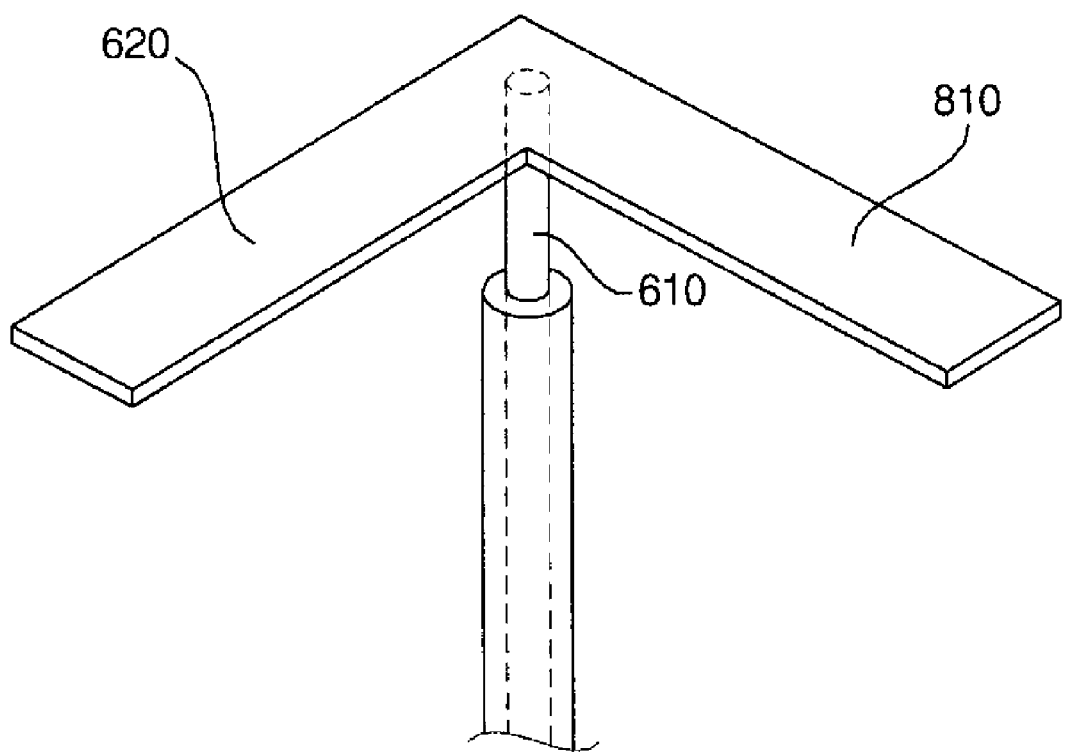

Next, with reference to FIG. 8, an antenna structure of FIG. 8 includes a first metal part 620 and a second metal part 710 similarly to the antenna structure of FIGS. 7(a) and 7(b). However, the antenna structure of FIG. 8 differs from the antenna structure of FIGS. 7(a) and 7(b) in that an angle between the first metal part 620 and the second metal part 710 is 90 degrees, instead of 180 degrees in FIGS. 7(a) and 7(b).

Preferably, each of the electric antenna structures shown in FIGS. 7(a) and 7(b) and FIG. 8 has an angle of 90 to 180 degrees between the first metal part 620 and the second metal part 710 so as to minimize cancellation between the magnetic field generated by the first metal part 620 and the magnetic field generated by the second metal part 710. For example, if the angle between the first metal part 620 and the second metal part 710 is less than 90 degrees, cancellation between the magnetic field generated by the first metal part 620 and the magnetic field generated by the second metal part 710 occurs, and thus the function of the antenna may be lowered.

Next, with reference to FIGS. 9(a) and 9(b), an antenna structure of FIGS. 9(a) and 9(b) includes a first metal part 620 similarly to the antenna structure of FIGS. 6(a) and 6(b), and further includes a third metal part 910. FIG. 9(a) exemplarily illustrates that the antenna including the first metal part 620 and the third metal part 910 is protruded to the inside of the cavity 134. Hereinafter, parts of the antenna structure of FIGS. 9(a) and 9(b) differing from the antenna structure of FIGS. 6(a) and 6(b) will be described.

The third metal part 910 of the antenna is connected to one end of the above-described first metal part 620 and is extended in the direction of the plate 634.

FIG. 9(b) is a side view exemplarily illustrating the antenna structure. A frequency band of microwaves which may be output may be set according to a length L1 of the first metal part 620, a distance d1 between the first metal part 620 and the plate 634 and a length L3 of the third metal part 910.

In order to increase the intensity of the electric field generated by the first metal part 620, the length L1 of the first metal part 620 is preferably greater than the length L3 of the third metal part 910.

Next, with reference to FIGS. 10(a) and 10(b), an antenna structure of FIGS. 10(a) and 10(b) includes a first metal part 620 and a third metal part 1010 similarly to the antenna structure of FIGS. 9(a) and 9(b). However, the antenna structure of FIGS. 10(a) and 10(b) differs from the antenna structure of FIGS. 9(a) and 9(b) in terms of the structure of the third metal part 1010. As shown in FIG. 10(a), one end of the third metal part 1010 in the direction of the plate 634 has a plate shape. Further, the antenna structure of FIGS. 10(a) and 10(b) may further include a dielectric 1020 disposed between the third metal part 1010 and the plate 634.

FIG. 10(b) is a side view exemplarily illustrating the antenna structure. A frequency band of microwaves which may be output may be set according to a length L1 of the first metal part 620, a distance d1 between the first metal part 620 and the plate 634, a length L3 of the third metal part 1010, a dielectric constant of the dielectric 1020 and a distance d2 between the dielectric 1020 or the third metal part 1010 and the plate 134.

Particularly, due to the plate-shaped end of the third metal part 1010 and disposition of the dielectric 1020, from among the magnetic field component and the electric field component of the antenna structure of FIGS. 10(a) and 10(b), the electric field component is partially strengthened.

Next, with reference to FIGS. 11(a) and 11(b), an antenna structure of FIGS. 11(a) and 11(b) includes a first metal part 620, a second metal part 710 and a third metal part 910 similarly to the antenna structure of FIGS. 9(a) and 9(b), and further includes a fourth metal part 1110. FIG. 11(a) exemplarily illustrates that the antenna including the first metal part 620, the second metal part 710, the third metal part 910 and the fourth metal part 1110 is protruded to the inside of the cavity 134. Hereinafter, parts of the antenna structure of FIGS. 11(a) and 11(b) differing from the antenna structure of FIGS. 9(a) and 9(b) will be described.

The fourth metal part 1110 of the antenna is connected to one end of the above-described second metal part 720 and is extended in the direction of the plate 634.

FIG. 11(*b*) is a side view exemplarily illustrating the antenna structure. A frequency band of microwaves which may be output may be set according to a length L1 of the first metal part 620, a distance d1 between the first metal part 620 and the plate 634, a length L3 of the third metal part 910, a length L2 of the second metal part 710 and a length L4 of the fourth metal part 1110.

In order to increase the intensity of the electric field generated by the second metal part 710, the length L2 of the second metal part 710 is preferably greater than the length L4 of the fourth metal part 1110.

Figure 12:
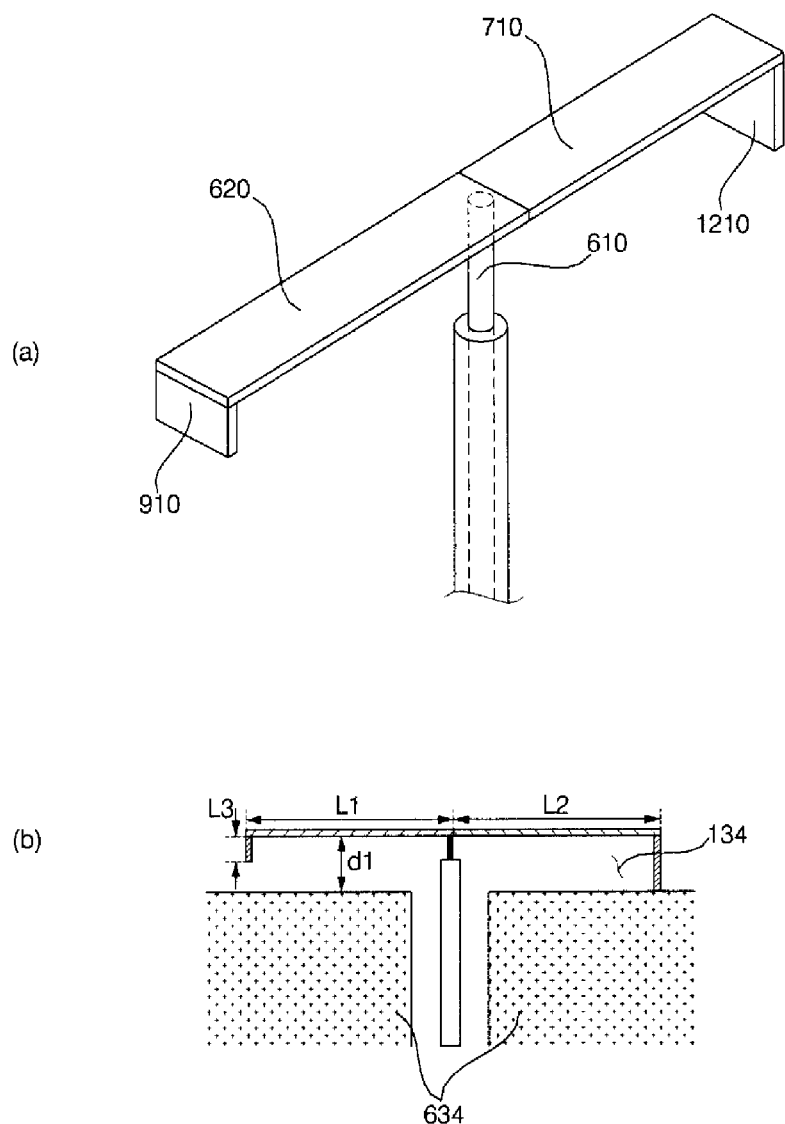

Next, with reference to FIGS. 12(*a*) and 12(*b*), an antenna structure of FIGS. 12(*a*) and 12(*b*) includes a first metal part 620, a second metal part 710, a third metal part 910 and a fourth metal part 1210 similarly to the antenna structure of FIGS. 11(*a*) and 11(*b*). FIG. 12(*a*) exemplarily illustrates that the antenna including the first metal part 620, the second metal part 710, the third metal part 910 and the fourth metal part 1210 is protruded to the inside of the cavity 134. Hereinafter, parts of the antenna structure of FIGS. 12(*a*) and 12(*b*) differing from the antenna structure of FIGS. 11(*a*) and 11(*b*) will be described.

The antenna structure of FIGS. 12(*a*) and 12(*b*) differs from the antenna structure of FIGS. 11(*a*) and 11(*b*) in that the fourth metal part 1210 is connected to the plate 634.

FIG. 12(*b*) is a side view exemplarily illustrating the antenna structure. By connecting the fourth metal part 1210 to the plate 634, as described above, the second metal part 710, the fourth metal part 1210 and the plate 634 form a loop, like a coil, and thus the magnetic field may be concentrated in a specific direction (for example, in the direction of the front region on the ground). Therefore, the magnetic field component is more strengthened than the electric field component formed by the corresponding metal parts 710 and 1210. Such an antenna structure may be referred to as a magnetic antenna.

Consequently, the antenna structure of FIGS. 12(*a*) and 12(*b*) is obtained through combination of an electric antenna formed by the first metal part 620 and the third metal part 910 and a magnetic antenna formed by the second metal part 710 and the fourth metal part 1210, and thus may be referred as a hybrid antenna.

Next, FIGS. 13(*a*) and 13(*b*) exemplarily illustrate antenna structures provided with openings. With reference to FIGS. 13(*a*) and 13(*b*), each of the antenna structures of FIGS. 13(*a*) and 13(*b*) includes a first metal part 620 and a second metal part 710 similarly to the antenna structure of FIGS. 7(*a*) and 7(*b*), and an opening is formed on at least one of the respective metal parts 620 and 710.

FIG. 13(*a*) exemplarily illustrates that openings 1310 and 1320 are respectively formed on the first metal part 620 and the second metal part 710. Thereby, the magnetic field component of the first metal part 620 is more weakened than the electric field component of the first metal part 620 and the magnetic field component of the second metal part 710 is more weakened than the electric field component of the second metal part 710, and thus such an antenna structure functions as an electric antenna.

Further, FIG. 13(*b*) exemplarily illustrates that in addition to the openings 1310 and 1320, cut parts 1315 and 1325 are respectively formed on the first metal part 620 and the second metal part 710. Due to formation of the cut parts 1315 and 1325 similarly to the effect of the openings 1310 and 1320, the magnetic field component is more weakened than the electric field component, and thus such an antenna structure functions as an electric antenna.

Formation of these openings or cut parts may be applied to the above-described antenna structures of FIGS. 6 to 12.

Figure 14:
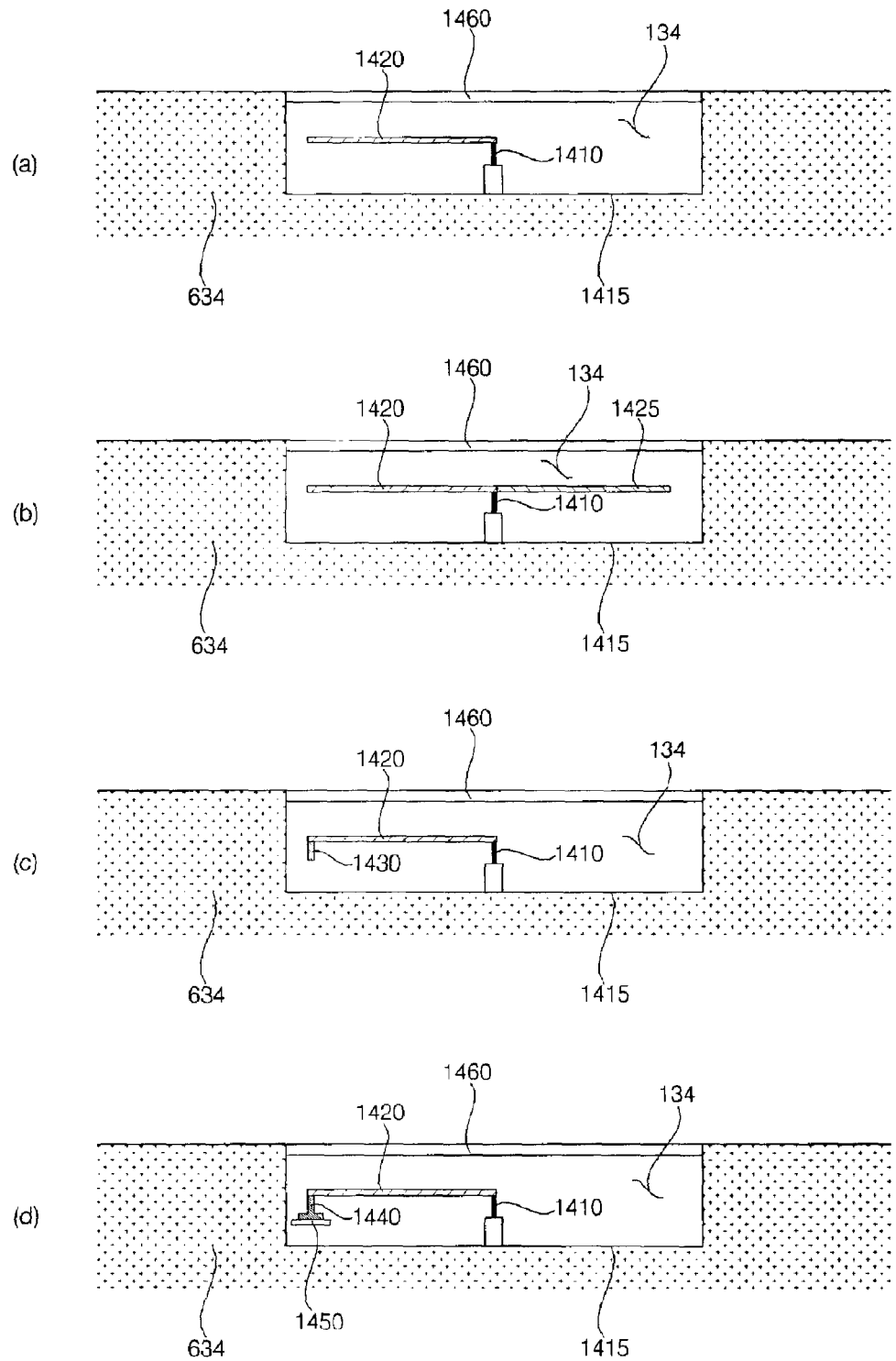
Figure 15:
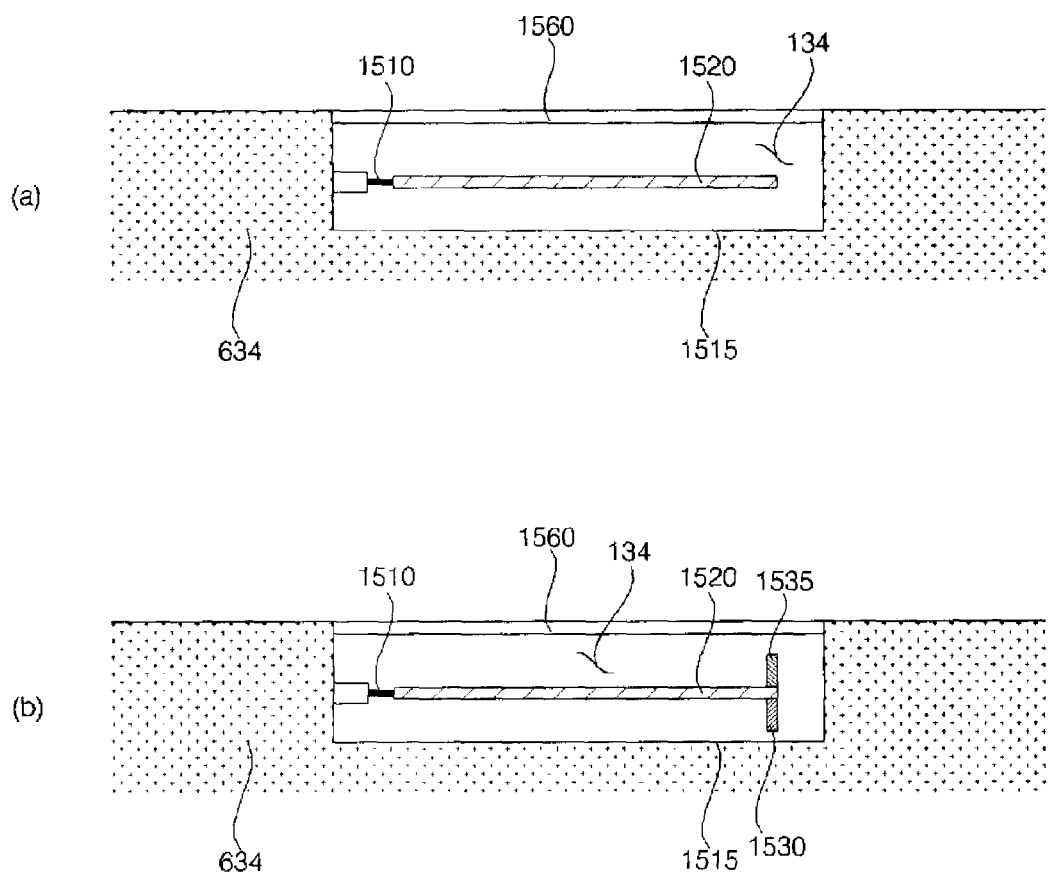

FIGS. 14 and 15 exemplarily illustrate various examples of formation of a bent part on a plate. First, with reference to FIGS. 14(*a*) to 14(*d*), the antenna may be disposed in a bent part 1415 formed on the plate 634. Thereby, the antenna is not exposed directly to the cavity 134, thus being safely protected.

Further, an antenna cover 1460 may be formed so as to cover the antenna disposed within the bent part 1415. Thereby, the antenna may be more safely protected.

Figure 6:
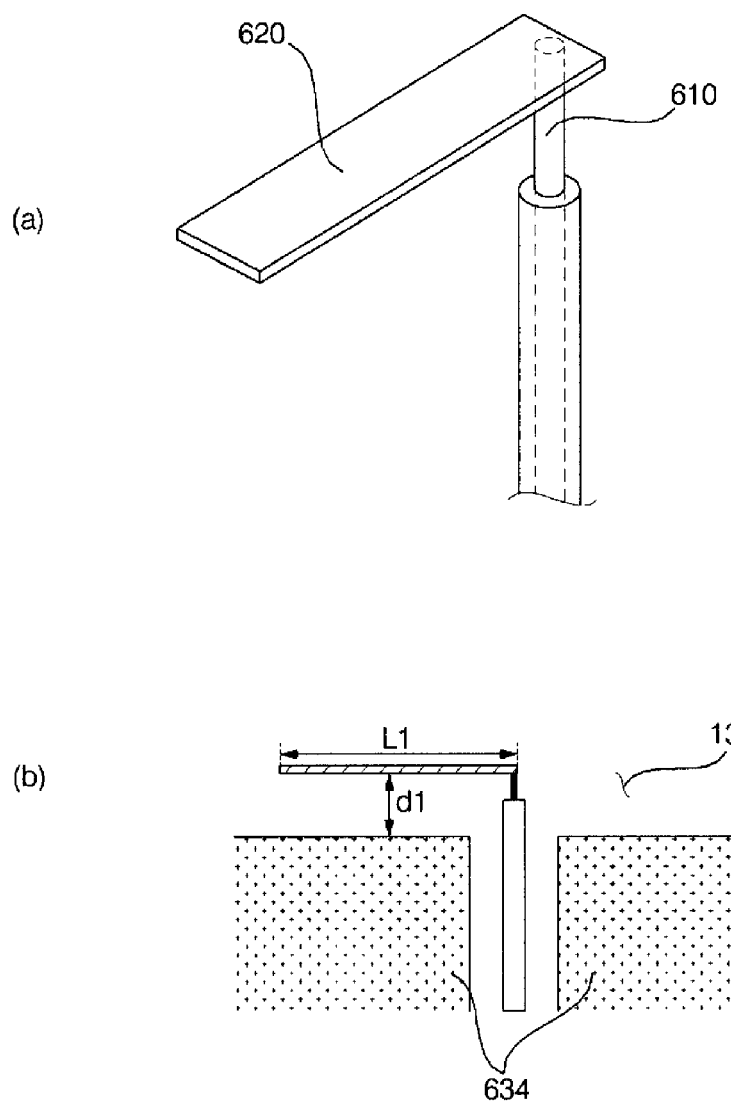

FIG. 14(*a*) exemplarily illustrates an antenna including a first metal part 1420, one end of which is connected to a microwave transmission line 1410, as shown in FIGS. 6(*a*) and 6(*b*).

Figure 10:
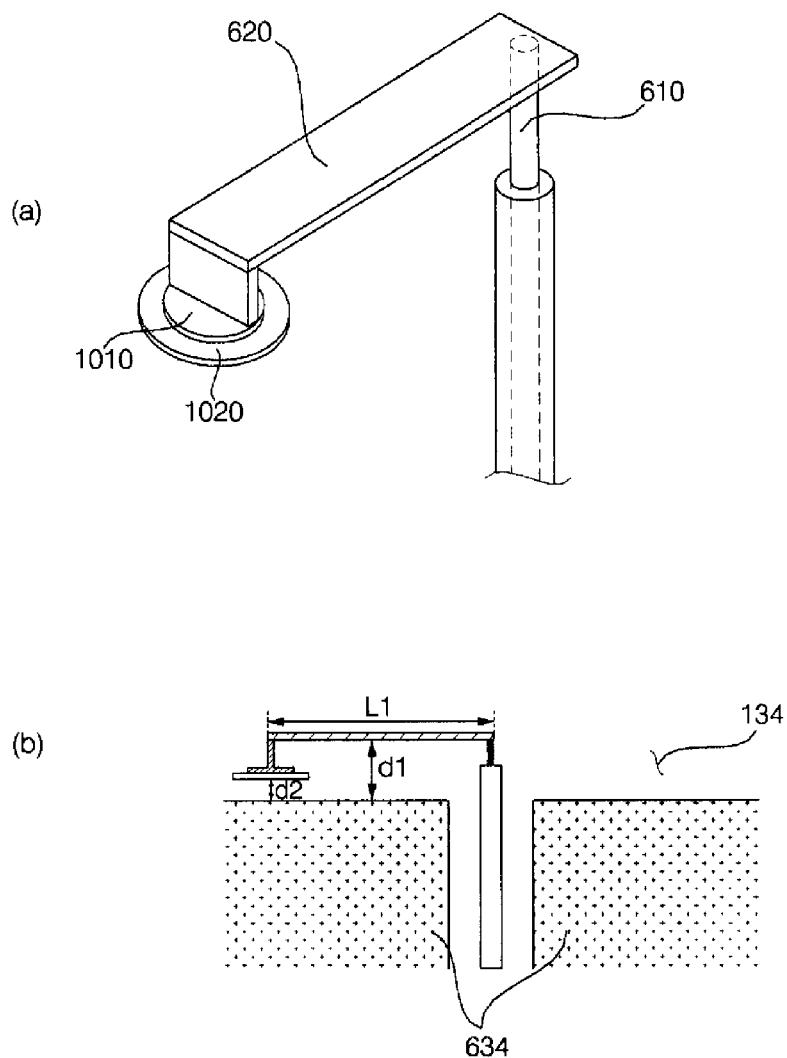

FIG. 14(*b*) exemplarily illustrates an antenna including a first metal part 1420 and a second metal part 1425, as shown in FIGS. 7(*a*) and 7(*b*), FIG. 14(*c*) exemplarily illustrates an antenna including a first metal part 1420 and a third metal part 1430, as shown in FIGS. 9(*a*) and 9(*b*), and FIG. 14(*d*) exemplarily illustrates an antenna including a first metal part 1420, a third metal part 1440, one end of which has a plate shape, and a dielectric 1450, as shown in FIGS. 10(*a*) and 10(*b*).

Next, with reference to FIGS. 15(*a*) and 15(*b*), an antenna may be disposed in a bent part 1515 formed on the plate 634. Particularly, differing from FIGS. 14(*a*) to 14(*d*), a microwave transmission line 1510 is protruded in a direction parallel with the plate 634, and a first metal part 1520 is connected to the microwave transmission line 1510 and is extended in the same direction as extension of the microwave transmission line 1510. Further, an antenna cover 1560 may be formed so as to cover the antenna disposed within the bent part 1515. Thereby, the antenna may be more safely protected.

FIG. 15(*a*) exemplarily illustrates an antenna including a first metal part 1520, one end of which is connected to a microwave transmission line 1510, as shown in FIGS. 6(*a*) and 6(*b*). FIG. 15(*b*) exemplarily illustrates an antenna including a first metal part 1520 and metal parts 1530 and 1535 respectively connected to one end of the first metal part 1520.

FIGS. 16 to 24 are views illustrating various antennas of the cooking apparatus using microwaves in accordance with the embodiment of the present invention.

First, with reference to FIGS. 16(*a*) and 16(*b*), the cooking apparatus using microwaves in accordance with the embodiment of the present invention includes an antenna. FIG. 16(*a*) exemplarily illustrates that the antenna including a first metal part 1620 and a second metal part 1630 is protruded to the inside of the cavity 134.

The first metal part 1620 of the antenna is connected to one end of a microwave transmission line 1610 to transmit microwaves to the inside of the cavity 134 and is extended in one direction. Particularly, the first metal part 1620 may be extended in parallel with a plate 634 forming the cavity 134. For example, if the antenna is formed on the ceiling of the cavity 134, the first metal part 1620 may be formed in parallel with the rear plate forming the ceiling of the cavity 134. Further, if the antenna is formed on the ceiling of the cavity 134, the first metal part 1620 may be formed in parallel with the bottom plate forming the bottom surface of the cavity 134. In addition, the first metal part 1620 may be formed at various positions, i.e., the rear plate or the side plate, in parallel with the corresponding plate.

The second metal part 1630 is connected to one end of the above-described first metal part 1620 and is extended in the direction of the plate 634. Particularly, the second metal part 1630 is connected to the plate 634.

FIG. 16(b) is a side view exemplarily illustrating the antenna structure. If the first metal part 1620 of the antenna is extended in parallel with the plate 634 forming the cavity 134, an electric field is formed among the first metal part 1620, the second metal part 1630 and the plate 634, and a rotating magnetic field is formed by the first metal part 1620, the second metal part 1630 and the plate 634.

Further, since one end of the second metal part 1630 is connected to the plate 634, as shown in FIG. 16(b), the first metal part 1620, the second metal part 1630 and the plate 634 form a loop, like a coil, and thus the magnetic field is concentrated in a specific direction (for example, in the direction of the front region on the ground). Therefore, the magnetic field component is more strengthened than the electric field component. Thus, such an antenna structure may be referred to as a magnetic antenna.

A frequency band of microwaves which may be output may be set according to a length L1 of the first metal part 1620 and a distance d1 between the first metal part 1620 and the plate 634.

In order to increase the intensity of the electric field generated by the first metal part 1620, the length L1 of the first metal part 1620 is preferably greater than the distance d1 between the first metal part 1620 and the plate 634.

In the antenna structure of FIGS. 16(a) and 16(b), the first metal part 1620 is disposed in parallel with the plate 634, differing from the conventional monopole antenna structure protruded to the inside of a cavity, thus having a small protrusion degree and a small size.

Further, adjustment factors regarding the frequency band of the microwaves, such as the length L1 of the first metal part 1620 and the distance d1 between the first metal part 1620 and the plate 634, increase, and thus the above antenna structure may be output considerably wideband microwaves, compared to the monopole antenna. Moreover, such an antenna structure may easily achieve impedance matching.

Although not shown in FIGS. 16(a) and 16(b), an antenna cover to cover the antenna structure of FIGS. 16(a) and 16(b) may be formed. The antenna cover may protect the antenna from pieces of an object to be cooked during operation of the cooking apparatus. Particularly, since such an antenna structure has a small protrusion degree compared to the conventional antenna, the antenna cover may easily protect the antenna structure. Such an antenna cover may be applied to antennas which will be described later with reference to FIGS. 17 to 22.

Further, the above antenna may be provided in plural number differing from FIGS. 16(a) and 16(b). In the same manner, antennas which will be described later with reference to FIGS. 17 to 24 may be provided in plural number.

Next, with reference to FIGS. 17(a) and 17(b), an antenna structure of FIGS. 17(a) and 17(b) includes a first metal part 1620 and a second metal part 1630 similarly to the antenna structure of FIGS. 16(a) and 16(b), and further includes a third metal part 1710. FIG. 17(a) exemplarily illustrates that the antenna including the first metal part 1620, the second metal part 1630 and the third metal part 1710 is protruded to the inside of the cavity 134. Hereinafter, parts of the antenna structure of FIGS. 17(a) and 17(b) differing from the antenna structure of FIGS. 16(a) and 16(b) will be described.

The third metal part 1710 of the antenna is connected to one end of the microwave transmission line 1610 to transmit microwaves to the inside of the cavity 134 and is extended in one direction. Particularly, the third metal part 1710 may be extended in parallel with the plate 634 forming the cavity 134. FIGS. 17(a) and 17(b) exemplarily illustrate the third metal part 1710 as being formed in the opposite direction to the first metal part 1620, i.e., at an angle of 180 degrees with respect to the first metal part 1620.

FIG. 17(b) is a side view exemplarily illustrating the antenna structure. A frequency band of microwaves which may be output may be set according to a length L1 of the first metal part 1620, a distance d1 between the first metal part 1620 and the plate 634 and a length L2 of the third metal part 1710.

If the end of the third metal part 1710 is not connected to the plate 634, differing from the antenna structure of FIGS. 16(a) and 16(b), the magnetic field component rotating around the third metal part 1720 is more strengthened than the electric field component. Such an antenna structure may be referred to as a magnetic antenna.

Consequently, the antenna structure of FIGS. 17(a) and 17(b) is obtained through combination of an electric antenna formed by the first metal part 1620, the second metal part 1630 and the plate 634 and a magnetic antenna formed by the third metal part 1710, and thus may be referred as a hybrid antenna.

Figure 17:
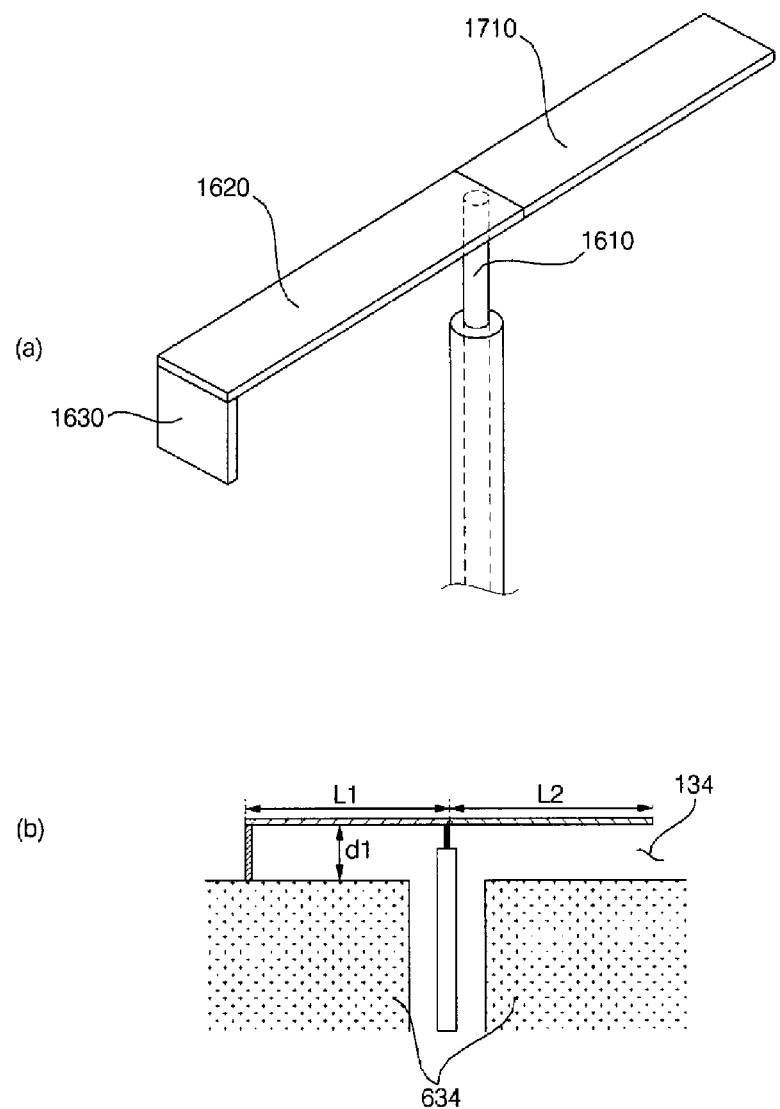
Figure 18:
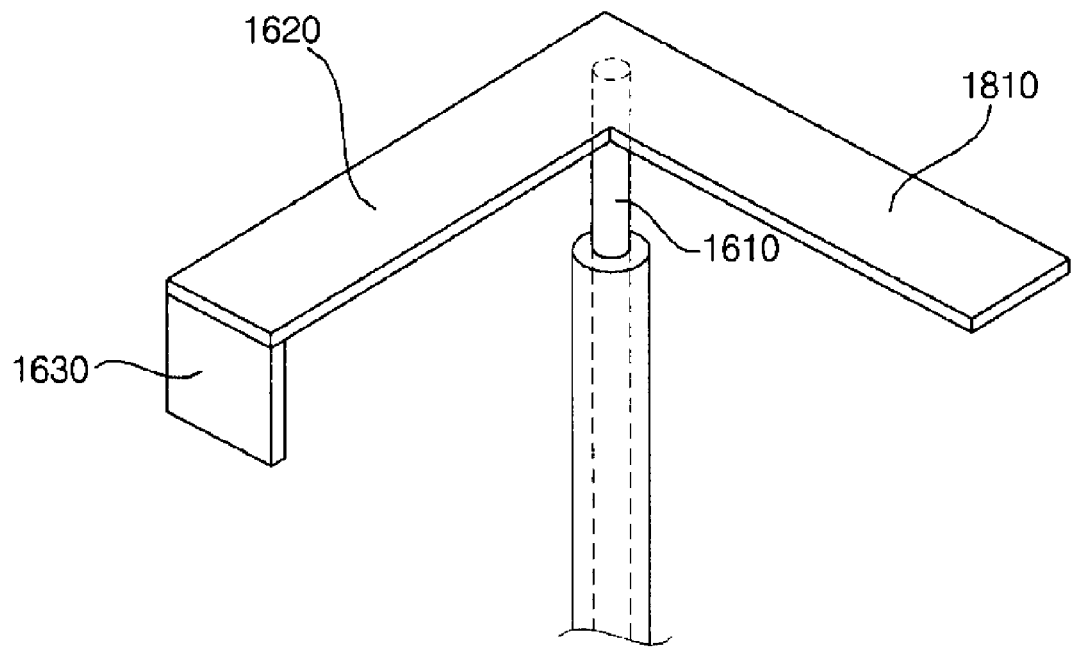

Next, with reference to FIG. 18, an antenna structure of FIG. 18 includes a first metal part 1620, a second metal part 1630 and a third metal part 1710 similarly to the antenna structure of FIGS. 17(a) and 17(b). However, the antenna structure of FIG. 18 differs from the antenna structure of FIGS. 17(a) and 17(b) in that an angle between the first metal part 1620 and the third metal part 1710 is 90 degrees, instead of 180 degrees in FIGS. 17(a) and 17(b).

Preferably, each of the electric antenna structures shown in FIGS. 17(a) and 17(b) and FIG. 18 have an angle of 90 to 180 degrees between the first metal part 1620 and the third metal part 1710 so as to minimize cancellation between the magnetic field generated by the first metal part 1620 and the magnetic field generated by the third metal part 1710. For example, if the angle between the first metal part 1620 and the third metal part 1710 is less than 90 degrees, cancellation between the magnetic field generated by the first metal part 1620 and the magnetic field generated by the third metal part 1710 occurs, and thus the function of the antenna may be lowered.

Next, with reference to FIGS. 19(a) and 19(b), an antenna structure of FIGS. 19(a) and 19(b) includes a first metal part 1620, a second metal part 1630 and a third metal part 1710 similarly to the antenna structure of FIGS. 17(a) and 17(b), and further includes a fourth metal part 1910. FIG. 19(a) exemplarily illustrates that the antenna including the first metal part 1620, the second metal part 1630, the third metal part 1710 and the fourth metal part 1910 is protruded to the inside of the cavity 134. Hereinafter, parts of the antenna structure of FIGS. 19(a) and 19(b) differing from the antenna structure of FIGS. 17(a) and 17(b) will be described.

The fourth metal part 1910 of the antenna is connected to one end of the above-described third metal part 1710 and is extended in the direction of the plate 634.

FIG. 19(b) is a side view exemplarily illustrating the antenna structure. A frequency band of microwaves which may be output may be set according to a length L1 of the first metal part 1620, a distance d1 between the first metal part 1620 and the plate 634 and a length L2 of the third metal part 1710.

In order to increase the intensity of the electric field generated by the third metal part 1710, the length L2 of the third metal part 1710 is preferably greater than the distance d1 between the third metal part 1710 and the plate 634.

Further, since one end of the fourth metal part 1910 is connected to the plate 634, as shown in FIG. 19(*b*), the third metal part 1710, the fourth metal part 1910 and the plate 634 form a loop, like a coil, and thus the generated magnetic field is concentrated in a specific direction (for example, in the direction of the front region on the ground). Therefore, the magnetic field component is more strengthened than the electric field component. Thus, such an antenna structure may be referred to as a magnetic antenna.

Figure 20:
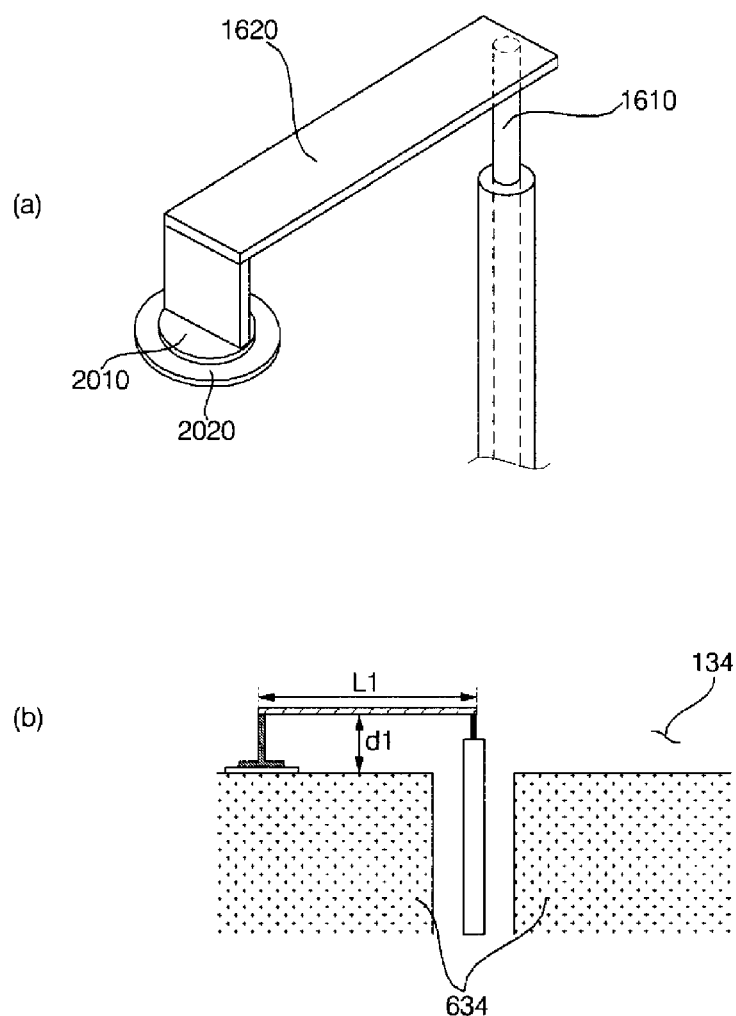

Next, with reference to FIGS. 20(*a*) and 20(*b*), an antenna structure of FIGS. 20(*a*) and 10(*b*) includes a first metal part 1620 and a second metal part 2010 similarly to the antenna structure of FIGS. 16(*a*) and 16(*b*). However, the antenna structure of FIGS. 20(*a*) and 20(*b*) differs from the antenna structure of FIGS. 16(*a*) and 16(*b*) in terms of the structure of the second metal part 2010. As shown in FIG. 20(*a*), one end of the second metal part 2010 in the direction of the plate 634 may have a plate shape. Further, the antenna structure of FIGS. 20(*a*) and 20(*b*) may further include a dielectric 2020 disposed between the second metal part 2010 and the plate 634. If the dielectric 2020 is further provided, the dielectric 2020 may be connected to the plate 634.

FIG. 20(*b*) is a side view exemplarily illustrating the antenna structure. A frequency band of microwaves which may be output may be set according to a length L1 of the first metal part 1620, a distance d1 between the first metal part 1620 and the plate 634 and a dielectric constant of the dielectric 2020.

Particularly, due to the plate-shaped end of the second metal part 2010 and disposition of the dielectric 2020, from among the magnetic field component and the electric field component of the antenna structure of FIGS. 20(*a*) and 20(*b*), the electric field component is partially strengthened.

Figure 21:
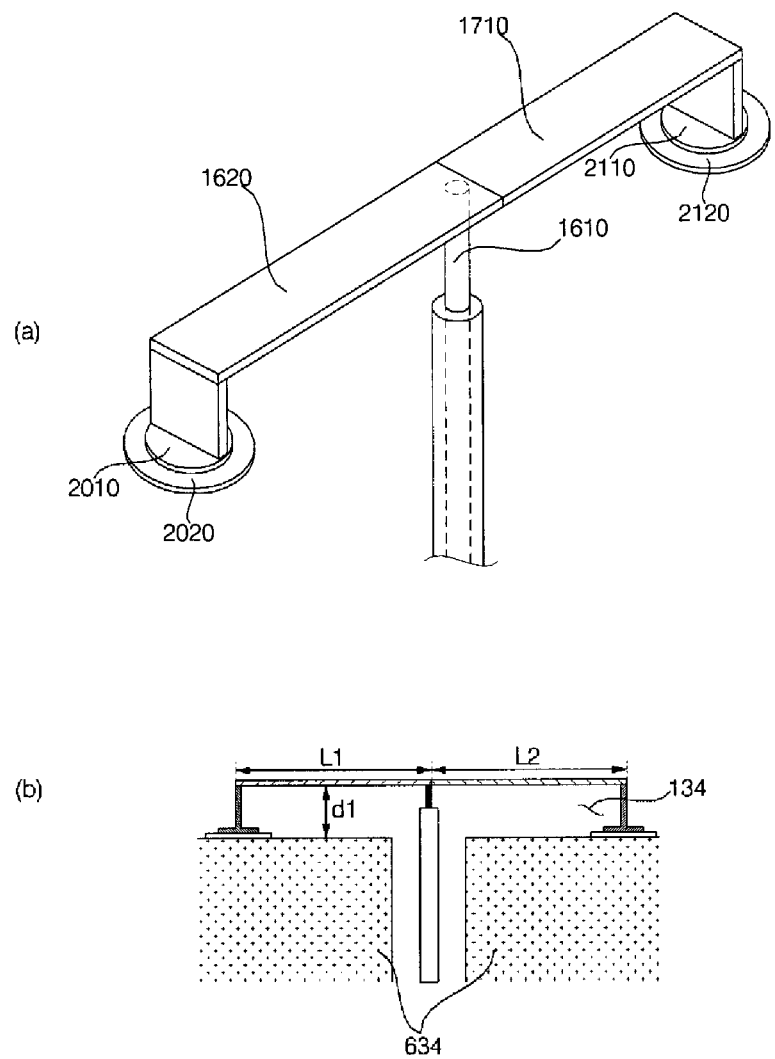

Next, with reference to FIGS. 21(*a*) and 21(*b*), an antenna structure of FIGS. 21(*a*) and 21(*b*) includes a first metal part 1620 and a second metal part 2010 similarly to the antenna structure of FIGS. 20(*a*) and 20(*b*), and further includes a third metal part 1710 and a fourth metal part 2110. Particularly, one end of the fourth metal part 2110 in the direction of the plate 634 may have a plate shape. Further, the antenna structure of FIGS. 21(*a*) and 21(*b*) may further include a dielectric 2120 disposed between the fourth metal part 2110 and the plate 634. If the dielectric 2120 is further provided, the dielectric 2120 may be connected to the plate 634.

FIG. 21(*b*) is a side view exemplarily illustrating the antenna structure. A frequency band of microwaves which may be output may be set according to a length L1 of the first metal part 1620, a distance d1 between the first metal part 1620 and the plate 634, a dielectric constant of the dielectric 2020, a length L2 of the third metal part 1710, a distance d1 between the third metal part 1710 and the plate 634 and a dielectric constant of the dielectric 2120.

Particularly, due to the plate-shaped end of the fourth metal part 2110 and disposition of the dielectric 2120, from among the magnetic field component and the electric field component of the antenna structure of FIGS. 21(*a*) and 21(*b*), the electric field component is partially strengthened.

Next, FIGS. 22(*a*) and 22(*b*) exemplarily illustrate antenna structures provided with openings. With reference to FIGS. 22(*a*) and 22(*b*), each of the antenna structures of FIGS. 22(*a*) and 22(*b*) includes a first metal part 1620, a second metal part 1630, a third metal part 1710 and a fourth metal part 1910 similarly to the antenna structure of FIGS. 19(*a*) and 19(*b*), and an opening is formed on at least one of the first metal part 1620 and the third metal part 1710.

FIG. 22(*a*) exemplarily illustrates that openings 2210 and 2220 are respectively formed on the first metal part 1620 and the third metal part 1710.

Further, FIG. 22(*b*) exemplarily illustrates that in addition to the openings 2210 and 2220, cut parts 2215 and 2225 are respectively formed on the first metal part 1620 and the third metal part 1710.

Formation of these openings or cut parts may be applied to the above-described antenna structures of FIGS. 16 to 21.

Figure 23:
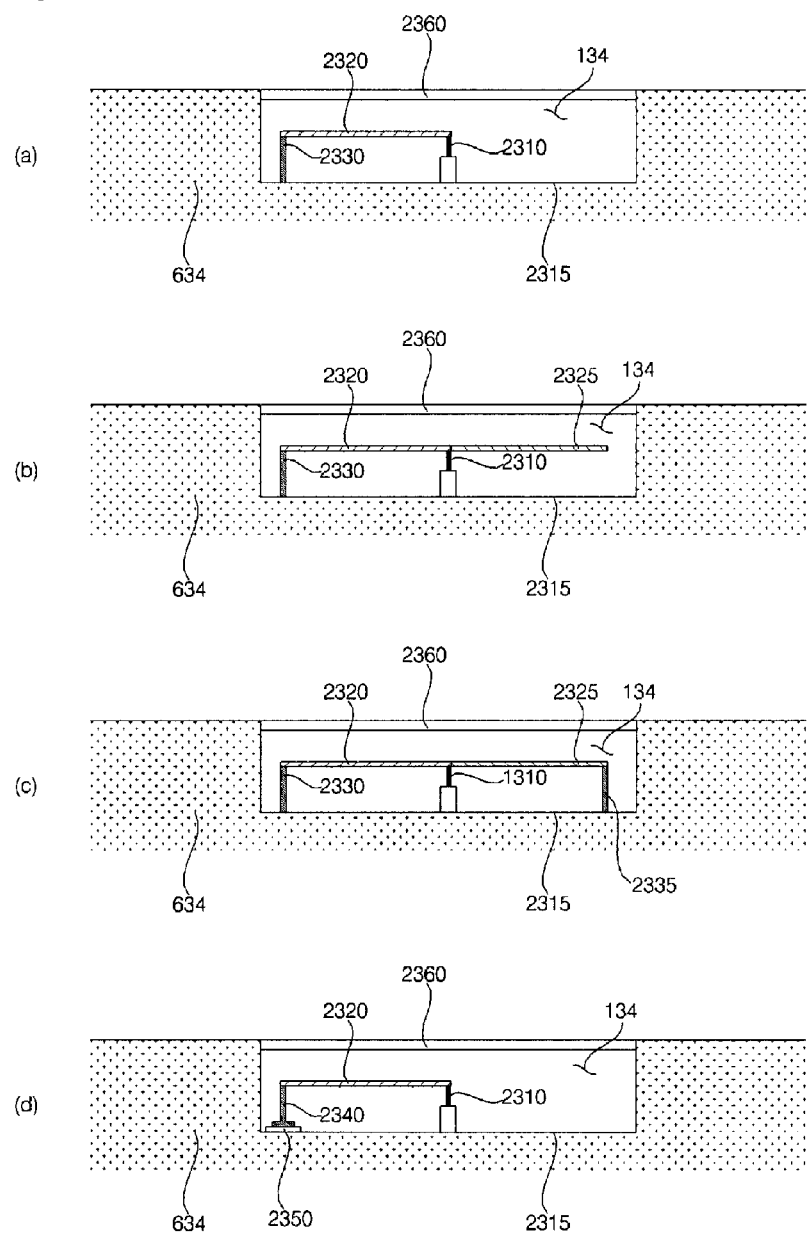
Figure 24:
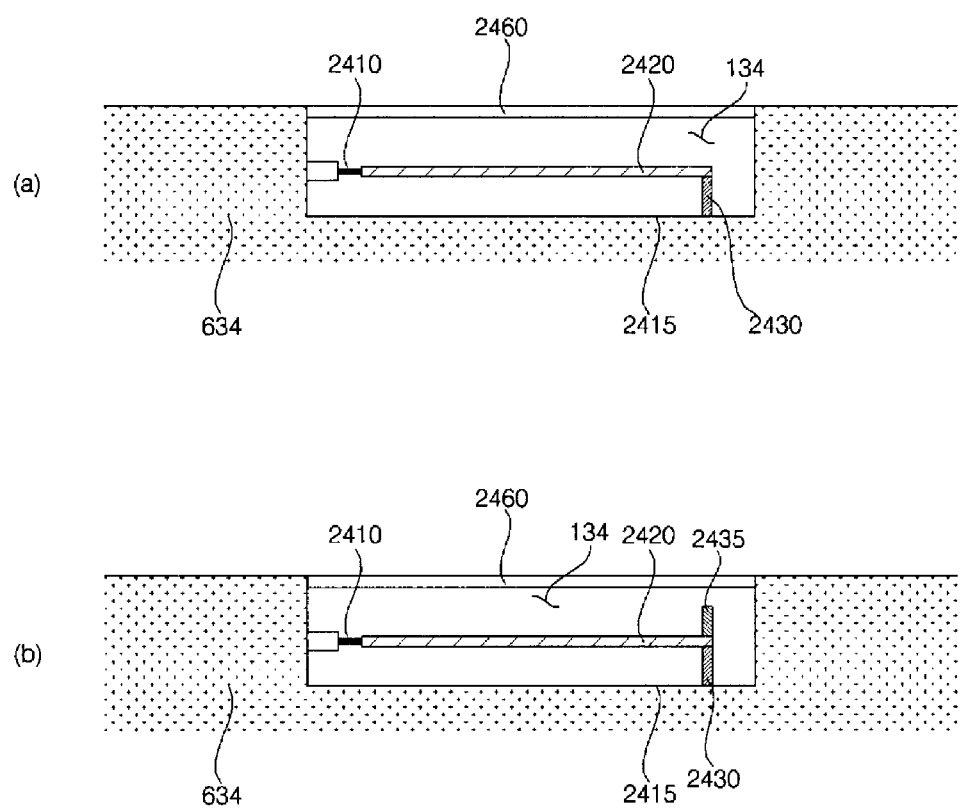

FIGS. 23 and 24 exemplarily illustrate various examples of formation of a bent part on a plate. First, with reference to FIGS. 23(*a*) to 23(*d*), the antenna may be disposed in a bent part 2315 formed on the plate 634. Thereby, the antenna is not exposed directly to the cavity 134, thus being safely protected.

Further, an antenna cover 2360 may be formed so as to cover the antenna disposed within the bent part 2315. Thereby, the antenna may be more safely protected.

FIG. 23(*a*) exemplarily illustrates an antenna including a first metal part 2320, one end of which is connected to a microwave transmission line 2310 and a second metal part 2330, one end of which is connected to the first metal part 2320, and, the other end of which is connected to the plate 634, as shown in FIGS. 16(*a*) and 16(*b*)

FIG. 23(*b*) exemplarily illustrates an antenna including a first metal part 2320, a second metal part 2330 and a third metal part 2325, as shown in FIGS. 17(*a*) and 17(*b*), FIG. 23(*c*) exemplarily illustrates an antenna including a first metal part 2320, a second metal part 2330, a third metal part 2325 and a fourth metal part 2335, as shown in FIGS. 19(*a*) and 19(*b*), and FIG. 23(*d*) exemplarily illustrates an antenna including a first metal part 2320, a second metal part 2340, one end of which has a plate shape, and a dielectric 2350, as shown in FIGS. 20(*a*) and 20(*b*).

Next, with reference to FIGS. 24(*a*) and 24(*b*), an antenna may be disposed in a bent part 2415 formed on the plate 634. Particularly, differing from FIGS. 23(*a*) to 23(*d*), a microwave transmission line 2410 is protruded in a direction parallel with the plate 634, and a first metal part 2420 is connected to the microwave transmission line 2410 and is extended in the same direction as extension of the microwave transmission line 2410. Further, a second metal part 2430 is connected to the end of the first metal part 2420, is extended in the direction of the plate 634 and is then connected to the plate 634. Further, an antenna cover 2460 may be formed so as to cover the antenna disposed within the bent part 2415. Thereby, the antenna may be more safely protected.

FIG. 24(*a*) exemplarily illustrates an antenna including a first metal part 2420, one end of which is connected to a microwave transmission line 2410, and a second metal part 2420, as shown in FIGS. 16(*a*) and 16(*b*). FIG. 24(*b*) exemplarily illustrates an antenna including a first metal part 2420 and metal parts 2430 and 2435 respectively connected to one end of the first metal part 2420. Here, the second metal part 2430 is extended in the direction of the plate 634 and is connected to the plate 634.

The above-described various control operations as performed by the microwave controller 350 may be performed by the controller 310. That is, the controller 310 may calculate heating efficiencies according to frequencies using microwaves output to the inside of the cavity and microwaves reflected by the inside of the cavity, and generate microwaves of designated frequencies based on the calculated heating efficiencies.

Although the embodiment of the present invention describes the cooking apparatus using microwaves, the present invention is not limited thereto and the cooking apparatus using microwaves may be combined with various cooking apparatuses. As one example, the cooking apparatus using microwaves in accordance with the embodiment of the present invention may be combined with an oven-type cooking apparatus using a heater as a heating source. Further, as another example, the cooking apparatus using microwaves in accordance with the embodiment of the present invention may be combined with a cooking apparatus using an induction heater as a heating source. Further, as a further example, the cooking apparatus using microwaves in accordance with the embodiment of the present invention may be combined with a cooking apparatus using a magnetron as a heating source.

The cooking apparatus in accordance with the present invention is not limited to configurations and methods of the above-described embodiments, and all or some of the respective embodiments may be selectively combined so as to achieve various modifications.

Effects of the present invention are not limited to the above-stated effects, and those skilled in the art will understand other effects, which are not stated above, from the accompanying claims.

Although the embodiments of the present invention have been disclosed for illustrative purposes, those skilled in the art will appreciate that various modifications and applications are possible, without departing from the scope and spirit of the invention as disclosed in the accompanying claims. For example, the respective elements described in detail in the embodiments may be modified. Further, it will be understood that differences relating to such modifications and applications are within the scope of the invention defined in the accompanying claims.

INDUSTRIAL APPLICABILITY

The present invention is applied to a cooking apparatus using microwaves.

The invention claimed is:

1. A cooking apparatus comprising:
a plate that forms a cavity;
a microwave transmission line that transmits microwaves to an inside of the cavity; and
an antenna that connects to the microwave transmission line, wherein the antenna includes:
    a first metal extension that connects to an end of the microwave transmission line and that extends in a first direction in parallel with the plate; and
    a second metal extension that connects to an end of the first metal extension and that extends in a second direction toward the plate,
wherein the second metal extension is connected to the plate; and
wherein the first metal extension, the second metal extension, and the plate form a loop.

2. The cooking apparatus according to claim 1, wherein the antenna further includes a third metal extension that connects to the end of the microwave transmission line and that extends in a third direction.

3. The cooking apparatus according to claim 2, wherein the antenna further includes a fourth metal extension that connects an end of the third metal extension to the plate.

4. The cooking apparatus according to claim 2, wherein at least one opening is formed on at least one of the first metal extension or the third metal extension.

5. The cooking apparatus according to claim 2, wherein:
a recess is formed on the plate; and
the first metal extension and the third metal extension are provided within the recess.

6. The cooking apparatus according to claim 2, further including a cover to cover the first metal and the third metal extension so as to not protrude into the cavity.

7. The cooking apparatus according to claim 6, further including a dielectric provided between the cover and the microwave transmission line.

8. The cooking apparatus according to claim 1, further including a dielectric provided between the second metal extension and the plate.

9. The cooking apparatus according to claim 1, wherein:
a recess is formed on the plate; and
the first metal extension is provided within the recess.

10. A cooking apparatus comprising:
a plate that forms a cavity;
a microwave transmission line that transmits microwaves to an inside of the cavity; and
an antenna that connects to the microwave transmission line, wherein the antenna includes:
    a first metal extension that connects to an end of the microwave transmission line and that extends in one direction;
    a second metal extension that connects an end of the first metal extension to the plate, wherein the second metal extension is connected to the plate; and
    wherein the first metal extension, the second metal extension, and the plate form a loop.

11. The cooking apparatus according to claim 10, further including a dielectric provided between the second metal extension and the plate.

12. The cooking apparatus according to claim 10, wherein:
a recess is formed on the plate; and
the first metal extension and the second metal extension are provided within the recess.

13. The cooking apparatus according to claim 10, further comprising a third metal extension connected to the end of the microwave transmission line and extended in one direction.

14. The cooking apparatus according to claim 13, further comprising a fourth metal extension connected to one end of the third metal extension and extended so as to be connected to the plate.

15. The cooking apparatus according to claim 14, further including a dielectric provided between the fourth metal extension and the plate.

16. The cooking apparatus according to claim 13, wherein at least one opening is formed on at least one of the first metal extension or the third metal extension.

17. The cooking apparatus according to claim 13, wherein:
a recess is formed on the plate; and
the first metal extension, the second metal extension, and the third metal extension are provided within the recess.

18. The cooking apparatus according to claim 13, further including a cover to cover the first metal extension and the third metal extension so as to not protrude into the cavity.

19. The cooking apparatus according to claim 18, further including a dielectric provided between the cover and the microwave transmission line.

* * * * *